United States Patent
Luo et al.

(10) Patent No.: US 11,928,893 B2
(45) Date of Patent: Mar. 12, 2024

(54) ACTION RECOGNITION METHOD AND APPARATUS, COMPUTER STORAGE MEDIUM, AND COMPUTER DEVICE

(71) Applicant: TENCENT TECHNOLOGY (SHENZHEN) COMPANY LIMITED, Shenzhen (CN)

(72) Inventors: Donghao Luo, Shenzhen (CN); Yabiao Wang, Shenzhen (CN); Chenyang Guo, Shenzhen (CN); Boyuan Deng, Shenzhen (CN); Chengjie Wang, Shenzhen (CN); Jilin Li, Shenzhen (CN); Feiyue Huang, Shenzhen (CN); Yongjian Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 303 days.

(21) Appl. No.: 17/530,428

(22) Filed: Nov. 18, 2021

(65) Prior Publication Data

US 2022/0076002 A1 Mar. 10, 2022

Related U.S. Application Data

(63) Continuation of application No. PCT/CN2020/120076, filed on Oct. 10, 2020.

(30) Foreign Application Priority Data

Nov. 20, 2019 (CN) .......................... 201911143008.2

(51) Int. Cl.
*G06V 20/40* (2022.01)
*G06F 18/213* (2023.01)
(Continued)

(52) U.S. Cl.
CPC ............ *G06V 40/20* (2022.01); *G06F 18/213* (2023.01); *G06T 7/246* (2017.01); *G06N 3/02* (2013.01); *G06T 2207/20081* (2013.01)

(58) Field of Classification Search
CPC ...... G06V 40/20; G06V 10/454; G06V 10/62; G06V 10/82; G06V 40/28; G06V 10/40;
(Continued)

(56) References Cited

U.S. PATENT DOCUMENTS

2017/0061251 A1    3/2017  Fan et al.
2018/0173979 A1*   6/2018  Fan ...................... G06V 40/172
(Continued)

FOREIGN PATENT DOCUMENTS

CN    109145150 A    1/2019
CN    109993096 A    7/2019
(Continued)

OTHER PUBLICATIONS

The World Intellectual Property Organization (WIPO) International Search Report for PCT/CN2020/120076 dated Jan. 12, 2021 5 Pages (including translation).

(Continued)

*Primary Examiner* — Samir A Ahmed
(74) *Attorney, Agent, or Firm* — ANOVA LAW GROUP PLLC

(57) ABSTRACT

An action recognition method includes: obtaining original feature submaps of each of temporal frames on a plurality of convolutional channels by using a multi-channel convolutional layer; calculating, by using each of the temporal frames as a target temporal frame, motion information weights of the target temporal frame on the convolutional channels according to original feature submaps of the target temporal frame and original feature submaps of a next temporal frame, and obtaining motion information feature (Continued)

maps of the target temporal frame on the convolutional channels according to the motion information weights; performing temporal convolution on the motion information feature maps of the target temporal frame to obtain temporal motion feature maps of the target temporal frame; and recognizing an action type of a moving object in image data of the target temporal frame according to the temporal motion feature maps of the target temporal frame on the convolutional channels.

19 Claims, 11 Drawing Sheets

(51) Int. Cl.
  *G06T 7/246* (2017.01)
  *G06V 40/20* (2022.01)
  *G06N 3/02* (2006.01)
(58) Field of Classification Search
  CPC ............... G06F 8/213; G06T 7/246; G06T 2207/20081; G06N 3/02; G06N 3/045; G06N 3/08; G08B 21/0261; G08B 21/0407
  See application file for complete search history.

(56) References Cited

U.S. PATENT DOCUMENTS

| | | |
|---|---|---|
| 2019/0304068 A1 | 10/2019 | Vogels et al. |
| 2020/0160043 A1 | 5/2020 | Yamada et al. |
| 2020/0234078 A1 | 7/2020 | Zhang et al. |
| 2020/0265255 A1 | 8/2020 | Li et al. |
| 2020/0380031 A1* | 12/2020 | Zhou ................. G06T 19/006 |

FOREIGN PATENT DOCUMENTS

| | | |
|---|---|---|
| CN | 110348345 A | 10/2019 |
| CN | 110362715 A | 10/2019 |
| CN | 110427807 A | 11/2019 |
| CN | 110866509 A | 3/2020 |
| JP | 2019028985 A | 2/2019 |
| WO | 2018124309 A1 | 7/2018 |
| WO | 2019091464 A1 | 5/2019 |

OTHER PUBLICATIONS

The Japan Patent Office (JPO) Decision to Grant a Patent for Application No. 2022-516004 and Translation dated Apr. 11, 2023 6 Pages.
The European Patent Office (EPO) Extended Search Report for EP Application No. 20888898.2 dated Sep. 27, 2022 9 Pages.
Pichao Wang et al., "Action Recognition From Depth Maps Using Deep Convolutional Neural Networks", Aug. 1, 2016, vol. 46 No. 4, pp. 498-509. IEEE Transactions on Human-Machine Systems, IEEE, Piscataway, NJ, USA.
Lionel Pigou et al., "Beyond Temporal Pooling: Recurrence and Temporal Convolutions for Gesture Recognition in Video", Feb. 11, 2016, arxiv.org.
Lionel Pigou et al., "Gesture and Sign Language Recognition with Temporal Residual Networks", Oct. 22, 2017, pp. 3086-3093 , 2017 IEEE International Conference on Computer Vision Workshops (ICCVW).
Reza Azad et al., "Dynamic 3D Hand Gesture Recognition by Learning Weighted Depth Motion Maps", Jun. 1, 2019, vol. 29, No. 6, pp. 1729-1740.IEEE Transactions on Circuits and Systems for Video Technology, USA.
Sangwoo Cho et al., "Spatio-Temporal Fusion Networks for Action Recognition" , Jun. 17, 2019, arxiv.org.

* cited by examiner

S702

Separately obtain motion information feature maps of a preceding temporal frame adjacent to the target temporal frame on the convolutional channels and motion information feature maps of the next temporal frame adjacent to the target temporal frame on the convolutional channels

S704

Perform, for each of the convolutional channels, a convolution operation on a motion information feature maps of the target temporal frame, a motion information feature map of the preceding temporal frame, and a motion information feature map of the next temporal frame on a same convolutional channel by using a temporal convolution kernel, to obtain the temporal motion feature maps of the target temporal frame on the convolutional channels

Input the temporal motion feature maps of the target temporal frame into a residual network layer, to obtain action feature information of the image data of the target temporal frame

S804

Input the action feature information into an action classification network layer, to recognize the action type of the moving object in the image data of the target temporal frame

FIG. 8A

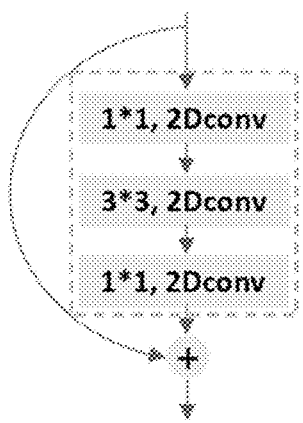

FIG. 8B

ACTION RECOGNITION METHOD AND APPARATUS, COMPUTER STORAGE MEDIUM, AND COMPUTER DEVICE

CROSS-REFERENCES TO RELATED APPLICATIONS

This application is a continuation application of PCT Patent Application No. PCT/CN2020/120076, filed on Oct. 10, 2020, which claims priority to Chinese Patent Application No. 2019111430082, entitled "ACTION RECOGNITION METHOD AND APPARATUS, COMPUTER-READABLE STORAGE MEDIUM, AND COMPUTER DEVICE" filed with the China National Intellectual Property Administration on Nov. 20, 2019, the entire contents of both of which are incorporated herein by reference.

FIELD OF THE TECHNOLOGY

The present disclosure relates to the field of artificial intelligence (AI) technologies and the field of image processing technologies, and in particular, to an action recognition method and apparatus, a computer-readable storage medium, and a computer device.

BACKGROUND OF THE DISCLOSURE

With the development of computer technologies and AI technologies, an action recognition technology has extended from the image field to the video field. In a conventional method, action recognition on video data is generally to recognize each frame of image in video data by using a two-dimensional (2D) convolutional neural network, and finally fuse action recognition results of all frames in the video data to obtain an action recognition result for the video data. However, in a scenario in which an action change of a moving object is emphasized, even if an order of frames of images in the video data is disrupted, the recognition result of the action type in the video data by the 2D convolutional neural network will not be affected. Therefore, performing action recognition by using a 2D convolutional neural network has low accuracy.

SUMMARY

According to various embodiments provided in the present disclosure, an action recognition method and apparatus, a computer-readable storage medium, and a computer device are provided.

According to an aspect of the present disclosure, an action recognition method is provided, performed by a computer device, the method including: obtaining image data of video data in a plurality of temporal frames; obtaining original feature submaps of each of the temporal frames on a plurality of convolutional channels by using a multi-channel convolutional layer; calculating, by using each of the temporal frames as a target temporal frame, motion information weights of the target temporal frame on the convolutional channels according to the original feature submaps of the target temporal frame on the convolutional channels and the original feature submaps of a next temporal frame adjacent to the target temporal frame on the convolutional channels; obtaining motion information feature maps of the target temporal frame on the convolutional channels according to the motion information weights and the original feature submaps of the target temporal frame on the convolutional channels; performing temporal convolution on the motion information feature maps to obtain temporal motion feature maps of the target temporal frame on the convolutional channels; and recognizing an action type of a moving object in image data of the target temporal frame according to the temporal motion feature maps.

According to an aspect of the present disclosure, an action recognition apparatus is provided, disposed in a computer device, the apparatus including: an image obtaining module, configured to: obtain image data of video data in a plurality of temporal frames; and obtain original feature submaps of each of the temporal frames on a plurality of convolutional channels by using a multi-channel convolutional layer; a weight obtaining module, configured to: calculate, by using each of the temporal frames as a target temporal frame, motion information weights of the target temporal frame on the convolutional channels according to the original feature submaps of the target temporal frame on the convolutional channels and the original feature submaps of a next temporal frame adjacent to the target temporal frame on the convolutional channels; a feature determining module, configured to obtain motion information feature maps of the target temporal frame on the convolutional channels according to the motion information weights of the target temporal frame on the convolutional channels and the original feature submaps of the target temporal frame on the convolutional channels; a temporal interaction module, configured to perform temporal convolution on the motion information feature maps of the target temporal frame on the convolutional channels to obtain temporal motion feature maps of the target temporal frame on the convolutional channels; and an action recognition module, configured to recognize an action type of a moving object in image data of the target temporal frame according to the temporal motion feature maps of the target temporal frame on the convolutional channels.

One or more non-transitory computer-readable storage media are provided, storing computer-readable instructions, the computer-readable instructions, when executed by one or more processors, causing the one or more processors to perform the operations in the action recognition method according to the embodiments of the present disclosure.

A computer device is provided, including a memory and one or more processors, the memory storing computer-readable instructions, the computer-readable instructions, when executed by the one or more processors, causing the one or more processors to perform: obtaining image data of video data in a plurality of temporal frames; obtaining original feature submaps of each of the temporal frames on a plurality of convolutional channels by using a multi-channel convolutional layer; calculating, by using each of the temporal frames as a target temporal frame, motion information weights of the target temporal frame on the convolutional channels according to the original feature submaps of the target temporal frame on the convolutional channels and the original feature submaps of a next temporal frame adjacent to the target temporal frame on the convolutional channels; obtaining motion information feature maps of the target temporal frame on the convolutional channels according to the motion information weights and the original feature submaps of the target temporal frame on the convolutional channels; performing temporal convolution on the motion information feature maps to obtain temporal motion feature maps of the target temporal frame on the convolutional channels; and recognizing an action type of a moving object in image data of the target temporal frame according to the temporal motion feature maps.

Details of one or more embodiments of the present disclosure are provided in the accompanying drawings and descriptions below. Based on the specification, the accompanying drawings, and the claims of the present disclosure, other features, objectives, and advantages of the present disclosure become clearer.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 7 is a schematic flowchart of steps of generating temporal motion feature maps according to an embodiment.

FIG. 8A is a schematic flowchart of steps of recognizing an action type of a moving object in image data of a target temporal frame according to temporal motion feature maps of the target temporal frame on convolutional channels according to an embodiment.

FIG. 8B is a schematic structural diagram of a residual network layer according to an embodiment.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are merely used for explaining the present disclosure but are not intended to limit the present disclosure.

AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, the CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biometric feature recognition technologies such as common face recognition and fingerprint recognition.

Figure 1:
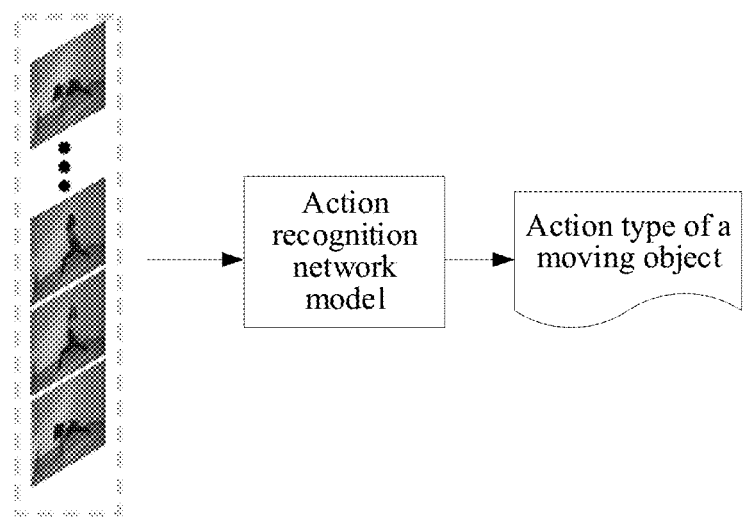
FIG. 1 is a diagram of an application environment of an action recognition method according to an embodiment.

FIG. 1 is a diagram of an application environment of an action recognition method according to an embodiment. Referring to FIG. 1, the action recognition method is applied to a computer device. The computer device may be a terminal or a server. As shown in FIG. 1, an example in which the computer device is a server is used. An action recognition network model is deployed in the computer device. The action recognition network is a network model correspondingly constructed according to the action recognition method provided in the present disclosure. The server extracts image data of a plurality of temporal frames from video data. As shown in FIG. 1, image data of each of the plurality of temporal frames obtained from the video data includes a moving object. The server inputs the extracted image data of the plurality of temporal frames into the action recognition network model. The action recognition network model performs action recognition on image data of each temporal frame obtained from the video data, to obtain an action type corresponding to the image data of each temporal frame. Subsequently, action types corresponding to the image data of all the temporal frames extracted from the video data may be fused, to obtain an action recognition result for the video data.

For example, in an exemplary application scenario, the video data may be an real-time surveillance video, and by inputting the real-time surveillance video into the action recognition network model, a real-time action of a monitored object in image data of each temporal frame in the surveillance video is recognized, to obtain action information of the monitored object in each frame of image data in the surveillance video, thereby implementing real-time monitoring on the monitored object without manually watching the video data to learn a behavior action of the monitored object.

In another example, in an exemplary application scenario, the video data may be a sign language video, and by inputting the sign language video into the action recognition network model, a hand action in image data of each temporal frame in the sign language video is recognized, to obtain sign language action information corresponding to the image data of each temporal frame in the sign language video, thereby achieving sign language translation.

Figure 2:
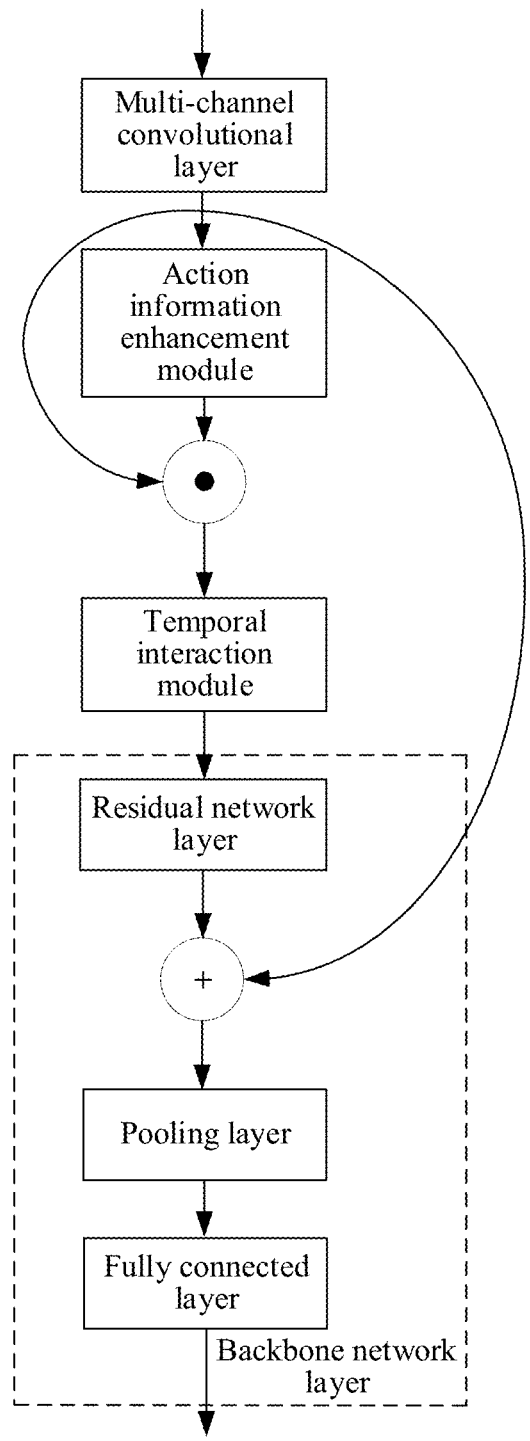
FIG. 2 is a schematic structural diagram of an action recognition network model according to an embodiment.

FIG. 2 is a schematic structural diagram of an action recognition network model according to an embodiment. As shown in FIG. 2, the action recognition network model includes a multi-channel convolutional layer, an action information enhancement module, a temporal interaction module, and a backbone network layer. After image data of video data in different temporal frames is obtained, the multi-channel convolutional layer is configured to obtain an original feature map of image data of each temporal frame, the original feature map including original feature submaps on different convolutional channels; the action information enhancement module is configured to perform action information enhancement on the original feature submaps of the image data of each temporal frame on different convolutional channels, to obtain motion information feature maps of the image data of each temporal frame on different convolutional channels; the temporal interaction module is configured to perform a convolution operation on motion information feature maps of image data of adjacent temporal frames on the same convolutional channel to obtain temporal motion feature maps, the temporal motion feature map being fused with motion information of the adjacent temporal frames; and the backbone network layer is configured to obtain action types of the moving object in the image data according to the temporal motion feature maps.

In an embodiment, the backbone network layer is a 2D convolutional network used for action recognition, and includes a plurality of network layers connected in sequence. In the action recognition network model shown in FIG. 2, the backbone network layer includes three sub-network layers connected in sequence. Optionally, the backbone network layer may be a ResNet-50 convolutional neural network.

Figure 3:
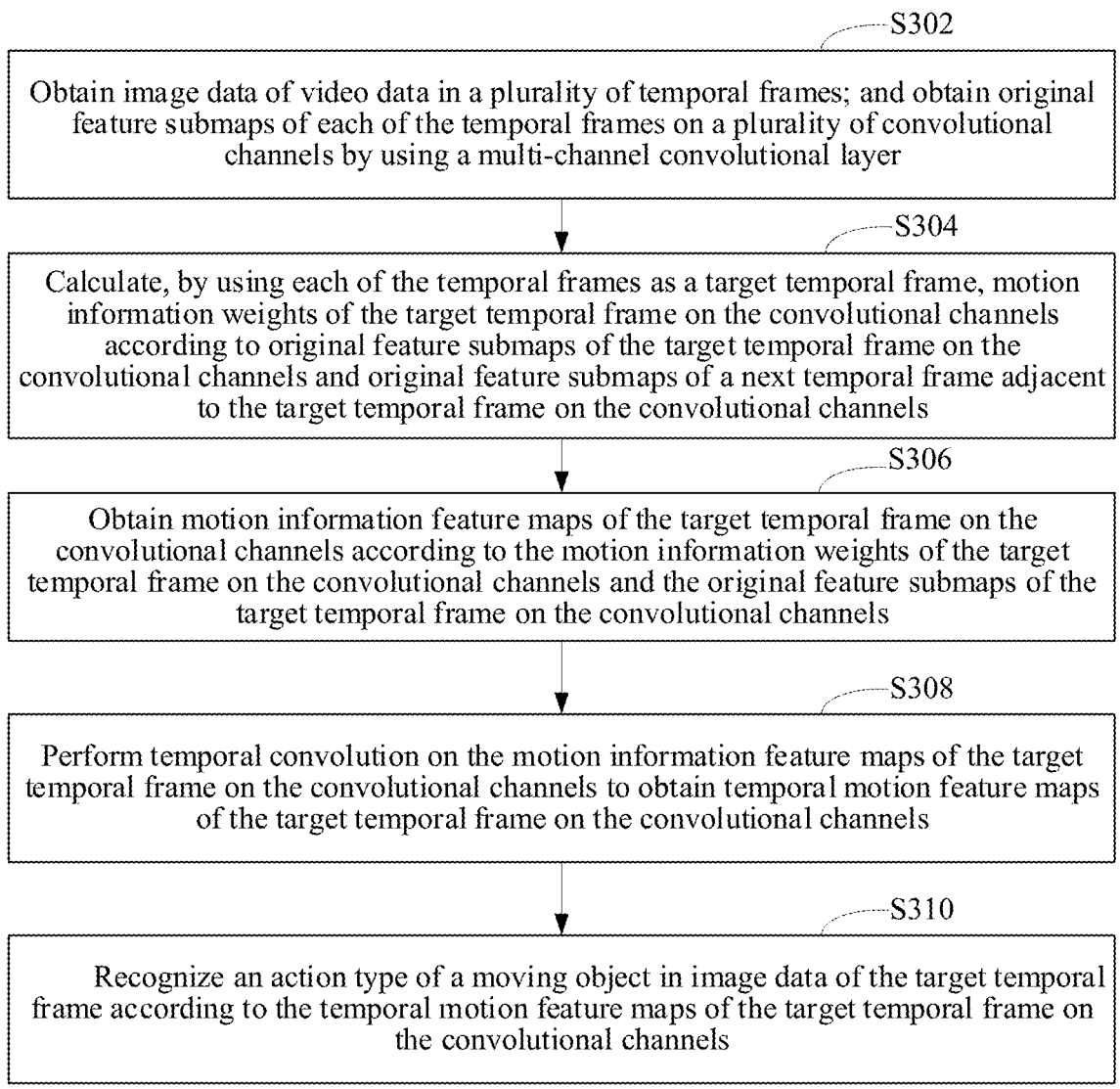
FIG. 3 is a schematic flowchart of an action recognition method according to an embodiment.

As shown in FIG. 3, in an embodiment, an action recognition method is provided. This embodiment is described mainly by using an example in which the method is applied to the server 102 in FIG. 1. Referring to FIG. 3, the action recognition method specifically includes the following steps:

Step S302: Obtain image data of video data in a plurality of temporal frames; and obtain original feature submaps of each of the temporal frames on a plurality of convolutional channels by using a multi-channel convolutional layer.

The video data may be any video data. In terms of content, the video data refers to a video including a moving object, such as a dance video, a surveillance video, or a sign language video. In terms of a source, the video data may be a surveillance video captured by using a camera or video data transmitted by another device.

The image data of different temporal frames refers to image data extracted from the video data in chronological order, and may include image data of all the temporal frames or image data of some consecutive temporal frames in the video data. The image data of the video data in different temporal frames may be specifically obtained according to an arrangement order of image data in the video data, or may be extracted from the video data with a specific sampling frequency. For example, image data of the first frame in the video data is used as image data of the first temporal frame, and then image data of subsequent temporal frames is extracted with a specific sampling frequency according to the arrangement order of the image data in the video data. It is to be understood that a quantity of frames of the image data may be determined according to a complexity requirement of action recognition or determined according to a quantity of image data frames in the video data.

The original feature submap refers to feature information representing image data. The multi-channel convolutional layer refers to a network model configured to obtain feature information in image data, and the multi-channel convolutional layer herein is a trained network model, which may be directly used to obtain feature information of image data. The multi-channel convolutional layer includes a plurality of convolution kernels. The convolutional channels are determined by the multi-channel convolutional layer. A quantity of convolution kernels in the multi-channel convolutional layer that are configured to extract image data is a quantity of the convolutional channels. Specifically, the image data is inputted into the multi-channel convolutional layer as input data of the multi-channel convolutional layer, and the convolution kernels in the multi-channel convolutional layer perform convolution calculation on the image data, to obtain original feature submaps on the convolutional channels corresponding to the convolution kernels.

A grayscale image is used as an example. Image data of different temporal frames obtained from the video data is a grayscale image. The grayscale image is inputted into the multi-channel convolutional layer, and an original feature map outputted by the multi-channel convolutional layer is obtained. Data dimensions of the original feature map are C, H, and W, where H and W identify a length and a width of the original feature map, and C represents a channel dimension of the original feature map, that is, the original feature map includes C original feature submaps.

Step S304: Calculate, by using each of the temporal frames as a target temporal frame, motion information weights of the target temporal frame on the convolutional channels according to original feature submaps of the target temporal frame on the convolutional channels and original feature submaps of a next temporal frame adjacent to the target temporal frame on the convolutional channels.

The next temporal frame refers to a temporal frame corresponding to a next time point relative to the target temporal frame. For example, the target temporal frame is the $(t)^{th}$ frame, that is, image data of the target temporal frame is image data of the $(t)^{th}$ frame obtained from the video data. Therefore, the next temporal frame is the $(t+1)^{th}$ frame, that is, image data of the next temporal frame is image data of the $(t+1)^{th}$ frame obtained from the video data.

The motion information weights refer to a probability distribution of attention allocation of the original feature submaps of the image data of the target temporal frame on different channels. Magnitudes of motion weights are relevant to correlations between the original feature submaps of the image data of the target temporal frame on different convolutional channels and action information of a moving object, or may be relevant to amounts of motion information included in the original feature submaps of the image data of the target temporal frame on different convolutional channels. It may be understood that a higher correlation between an original feature submap of the image data of the target temporal frame on a convolutional channel and action information of the moving object indicates that more motion information is included, and then more attention is allocated to the original feature submap on the convolutional channel, that is, a motion information weight is larger.

Image data of each temporal frame obtained from the video data includes information that is critical for action recognition, for example, apparent information of the moving object; and also includes noise information that is useless or even counterproductive for action recognition, for example, noise or background information in the image data. After the correlations between the original feature submaps of the image data of the target temporal frame on different convolutional channels and the action information of the moving object, that is, the motion information weights are obtained, by increasing feature information included in an original feature submap that is more relevant to the action information of the moving object, that is, allocating more attention for the original feature submap on the convolutional channel, and suppressing an original feature submap that includes less action information of the moving object or includes more noise information, that is, allocating less attention for the original feature submap on the convolutional channel, information that is beneficial to action recognition is enhanced and information that is irrelevant or even harmful to action recognition is suppressed, thereby effectively improving the accuracy of action recognition.

Because in image data of a single temporal frame, both the moving object and background information are static, and motion is a process of an action change, an action change process of the moving object needs to be described by using the image data of the target temporal frame and image data of the next temporal frame of the target temporal frame, to improve the accuracy of action recognition. Specifically, after original feature submaps of image data of each temporal frame on the convolutional channels are obtained, the image data of the each temporal frame is used as image data of the target temporal frame, to obtain motion information weights corresponding to the original feature submaps of the target temporal frame on the convolutional channels according to the original feature submaps of the image data of the target temporal frame on different convolutional channels and original feature submaps of image data of a next temporal frame of the target temporal frame on different convolutional channels.

Further, the obtaining motion information weights included in the original feature submaps of the target temporal frame on the convolutional channels may be specifically that: differences between the original feature submaps of the image data of the target temporal frame on the convolutional channels and the original feature submaps of the image data of the next temporal frame of the target temporal frame on corresponding convolutional channels are first calculated, and then the corresponding motion information weights of the image data of the target temporal frame on the convolutional channels are determined according to the differences between the original feature submaps on the convolutional channels.

Step S306: Obtain motion information feature maps of the target temporal frame on the convolutional channels according to the motion information weights of the target temporal frame on the convolutional channels and the original feature submaps of the target temporal frame on the convolutional channels.

After the motion information weights of the target temporal frame on the convolutional channels are obtained, the motion information weights of the target temporal frame on the convolutional channels may be added to the original feature submaps of the target temporal frame on the corresponding convolutional channels, to obtain motion information feature maps of the target temporal frame on the convolutional channels.

Because the motion information weights are used for describing correlations between the original feature submaps of the image data of the target temporal frame on different convolutional channels and the action information of the moving object, by multiplying a motion information weight on each convolutional channel by an original feature submap on the corresponding channel to obtain motion information feature maps of the target temporal frame on the convolutional channels, and enhancing original feature submaps that are more relevant to the action information of the moving object and suppressing original feature submaps that are less relevant to the action information of the moving object, information that is beneficial to action recognition is enhanced and information that is irrelevant or even harmful to action recognition is suppressed, so that the motion information feature maps include more action information of the moving object, which is beneficial to subsequent action recognition on the moving object and effectively improves the accuracy of action recognition.

Step S308: Perform temporal convolution on the motion information feature maps of the target temporal frame on the convolutional channels to obtain temporal motion feature maps of the target temporal frame on the convolutional channels.

The performing temporal convolution on the motion information feature maps of the target temporal frame on the convolutional channels may be specifically that: temporal frames to be convolved are determined according to the target temporal frame, and motion information feature maps of the target temporal frame and the to-be-convolved temporal frames on the same convolutional channel are convolved. The to-be-convolved temporal frames are temporal frames adjacent to the target temporal frame, and may include a preceding temporal frame and a next temporal frame of the target temporal frame, or may alternatively include previous two temporal frames and next two temporal frames of the target temporal frame. For example, the target temporal frame is the $(t)^{th}$ frame. The to-be-convolved temporal frames may include a preceding temporal frame and a next temporal frame that are adjacent to the target temporal frame. That is, the to-be-convolved temporal frames may include the $(t-1)^{th}$ frame and the $(t+1)^{th}$ frame. In other words, for the $(t)^{th}$ frame, motion information feature maps of the $(t-1)^{th}$ frame, the $(t)^{th}$ frame, and the $(t+1)^{th}$ frame on the same convolutional channel are convolved, to obtain temporal motion feature maps of the $(t)^{th}$ frame on the convolutional channels. The to-be-convolved temporal frames may alternatively include previous two temporal frames and next two temporal frames that are adjacent to the target temporal frame. That is, the to-be-convolved temporal frames include the $(t-2)^{th}$ frame, the $(t-1)^{th}$ frame, the $(t+1)^{th}$ frame, and the $(t+2)^{th}$ frame. In this case, for the Or frame, motion information feature maps of the $(t-2)^{th}$ frame, the $(t-1)^{th}$ frame, the $(t)^{th}$ frame, the $(t+1)^{th}$ frame, and the $(t+2)^{th}$ frame on the same convolutional channel are convolved, to obtain temporal motion feature maps of the $(t)^{th}$ frame on the convolutional channels.

Specifically, after the motion information feature maps of temporal frames on the convolutional channels are obtained, temporal frames adjacent to the target temporal frame may be determined as to-be-convolved temporal frames, and a convolution operation is performed on motion information feature maps of the target temporal frame and the to-beconvolved temporal frames on the same convolutional channel, to obtain temporal motion feature maps of the target temporal frame on the convolutional channels, so that the temporal motion feature maps are fused with motion information feature maps of previous and next temporal frames, that is, action information of the moving object, thereby implementing modeling in the temporal dimension. A method for obtaining motion information feature maps of the to-be-convolved temporal frames on the convolutional channels is the same as the method for obtaining the motion information feature maps of the target temporal frame on the convolutional channels.

Figure 4:
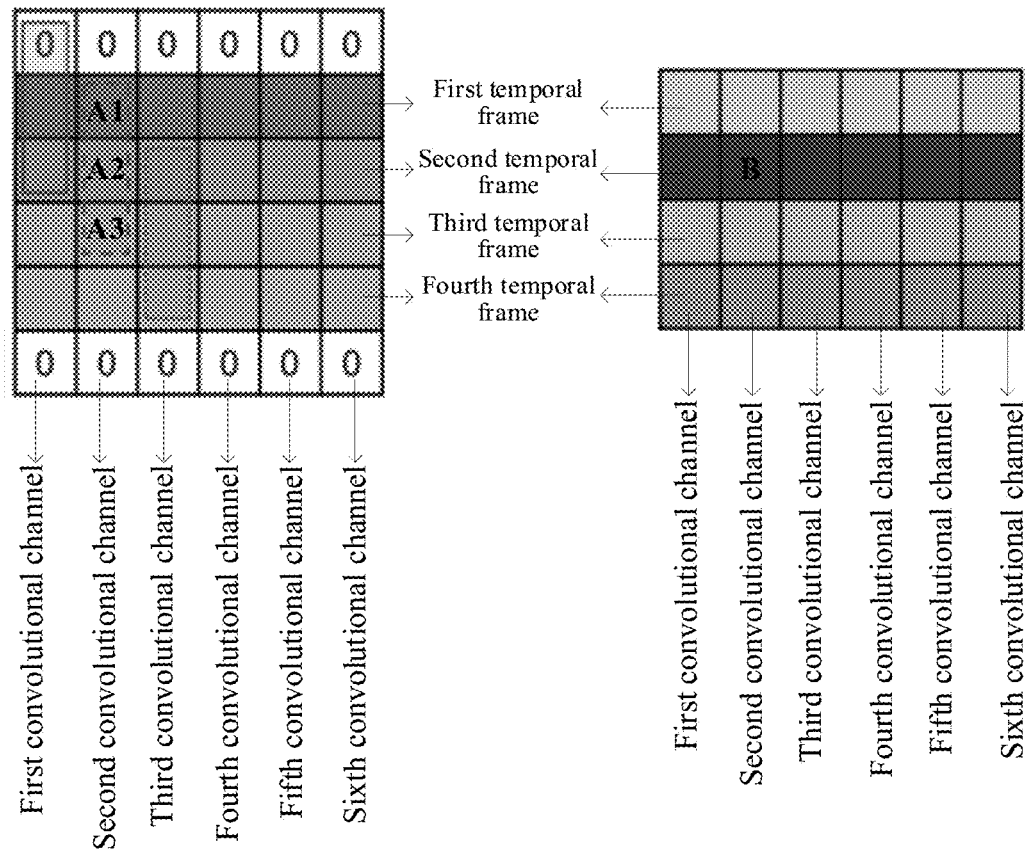
FIG. 4 is a schematic diagram of steps of generating temporal motion feature maps according to an embodiment.

FIG. 4 is a schematic diagram of performing temporal convolution on the motion information feature maps of the target temporal frame on the convolutional channels to obtain temporal motion feature maps of the target temporal frame on the convolutional channels according to an embodiment. The left matrix diagram in the figure represents motion information feature maps of the temporal frames on the convolutional channels, and the right matrix diagram in the figure represents temporal motion feature maps of the temporal frames on the convolutional channels. A horizontal axis of the matrix diagram in the figure represents a dimension of the convolutional channel, and a vertical axis of the matrix diagram represents a dimension of the temporal frame. By using the left matrix diagram as an example, the first row of the left matrix diagram in the figure represents motion information feature maps of the first temporal frame on the convolutional channels, the second row of the left matrix diagram represents motion information feature maps of the second temporal frame on the convolutional channels, and so on. An example in which the second temporal frame is used as the target temporal frame, and the to-be-convolved temporal frames include a preceding temporal frame of the second temporal frame and a next temporal frame of the second temporal frame is used. A 3*1 convolution kernel is used to perform a convolution operation on a motion information feature map of the first temporal frame on the first convolutional channel, a motion information feature map of the second temporal frame on the first convolutional channel, and a motion information feature map of the third temporal frame on the first convolutional channel, to obtain a temporal motion feature map of the second temporal frame on the first convolutional channel. Similarly, a 3*1 convolution kernel is used to perform a convolution operation on a motion information feature map (A1 in the figure) of the first temporal frame on the second convolutional channel, a motion information feature map (A2 in the figure) of the second temporal frame on the second convolutional channel, and a motion information feature map (A3 in the figure) of the third temporal frame on the second convolutional channel, to obtain a temporal motion feature map (B in the figure) of the second temporal frame on the second convolutional channel. By analogy, temporal motion feature maps of the second temporal frame on the convolutional channels are obtained. For any temporal frame, previous and next temporal frames adjacent to the temporal frame may be used to perform a convolution operation in the temporal dimension on the convolutional channels, so that temporal motion feature maps obtained through the operation are fused with motion information feature maps of the previous and next temporal frames, that is, action information of the moving object.

It is to be understood that as shown in FIG. 4, for the first temporal frame and the last fourth temporal frame, because there is no image data of a preceding temporal frame or a next temporal frame, a zero fill operation may be performed on a preceding temporal frame of the first temporal frame and a next temporal frame of the last fourth temporal frame.

Step S310: Recognize an action type of a moving object in image data of the target temporal frame according to the temporal motion feature maps of the target temporal frame on the convolutional channels.

After the temporal motion feature maps of the image data of the target temporal frame are obtained, the temporal motion feature maps may be used as feature information of the image data, to recognize the action type of the moving object in the image data of the target temporal frame. The temporal motion feature maps includes both information that is relatively highly relevant to motion and temporal information, so that using the temporal motion feature maps to perform action recognition can effectively improve the accuracy of action recognition.

Specifically, the temporal motion feature maps may be inputted, as feature information of the image data, into a 2D convolutional network used for action recognition, to recognize the action type of the moving object in the image data of the target temporal frame. The 2D convolutional network may include a ResNet-50 convolutional neural network. After the temporal motion feature maps of the target temporal frame on the channels are inputted into the ResNet-50 convolutional neural network, probabilities that the temporal motion feature maps point to action types are correspondingly outputted, to recognize the action type of the moving object in the image data of the target temporal frame.

The action recognition network model shown in FIG. 2 is used as an example. The step of recognizing the action type of the moving object in the image data of the target temporal frame according to the temporal motion feature maps of the target temporal frame on the convolutional channels is performed by the backbone network layer. The temporal motion feature maps of the target temporal frame on the convolutional channels are inputted into the backbone network layer. The backbone network layer functions as a classifier, and outputs the action type of the moving object in the image data of the target temporal frame. The step of obtaining original feature submaps of the image data of the temporal frames on different convolutional channels described in step S302 is performed by the multi-channel convolutional layer, and the original feature submaps of the image data of the temporal frames on different convolutional channels are obtained by using the multi-channel convolutional layer. The steps of calculating, by using each of the temporal frames as a target temporal frame, motion information weights of the target temporal frame on the convolutional channels according to original feature submaps of the target temporal frame on the convolutional channels and original feature submaps of a next temporal frame adjacent to the target temporal frame on the convolutional channels described in step S304 are performed by an action information enhancement module. The step of performing temporal convolution on the motion information feature maps of the target temporal frame on the convolutional channels to obtain temporal motion feature maps of the target temporal frame on the convolutional channels described in step S308 is performed by a temporal interaction module.

According to the foregoing action recognition method, image data of video data in different temporal frames is obtained; after original feature submaps of the image data of the temporal frames on different convolutional channels are obtained by using a multi-channel convolutional layer, each of the temporal frames is used as a target temporal frame, and motion information weights of the target temporal frame on the convolutional channels are obtained according to original feature submaps of the target temporal frame and a next temporal frame on the convolutional channels; the motion information weights are added to original feature submaps on corresponding convolutional channels to enhance motion information on original feature submaps of a single temporal frame, to obtain motion information feature maps of the target temporal frame on the convolutional channels; temporal convolution is then performed on the motion information feature maps of the target temporal frame on the convolutional channels, so that the motion information feature maps of the target temporal frame on the convolutional channels are fused with motion information feature maps from adjacent temporal frames, to implement modeling in the temporal dimension, and obtain temporal motion feature maps of the target temporal frame on the convolutional channels; and finally the temporal motion feature maps of the target temporal frame on the convolutional channels are used as feature information of image data of the target temporal frame for action recognition, to recognize an action type of a moving object in the image data of the target temporal frame. The action recognition method implements modeling on temporal information between the temporal frames while enhancing motion information on original feature submaps of a single temporal frame, and a completely different action recognition result will be obtained when an order of the temporal frames is disrupted, thereby effectively improving accuracy of action recognition.

In an embodiment, after the step of recognizing an action type of a moving object in image data of the target temporal frame according to the temporal motion feature maps of the target temporal frame on the convolutional channels, the method further includes: determining, after action types of the moving object in the image data of the temporal frames are obtained, an action type of the video data according to the action types of the temporal frames.

After the action type of the moving object in the image data of the target temporal frame is obtained, subsequent temporal frames are used as target temporal frames according to an order of the temporal frames, and action types of the moving object in image data of the temporal frames are obtained. After action types of the moving object in image data of all the temporal frames are obtained, the action types corresponding to the moving object in the image data of all the temporal frames of the video data are finally fused, to obtain an action recognition result for the video data.

Figure 5:
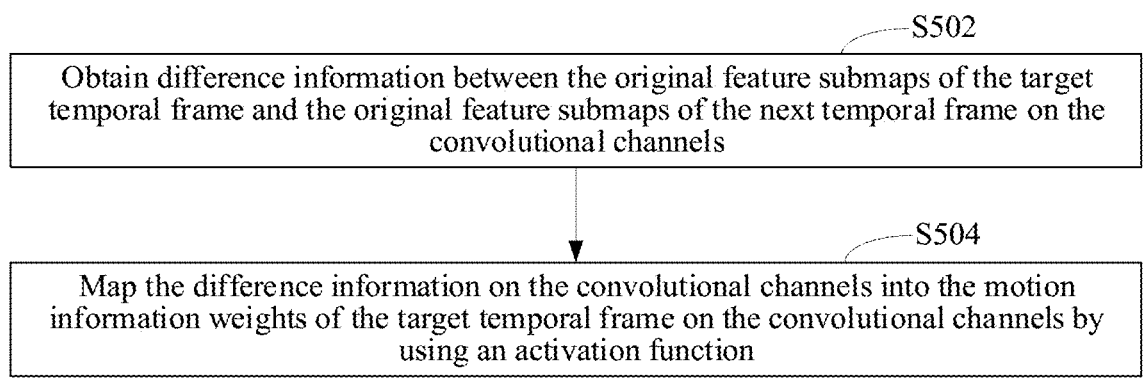
FIG. 5 is a schematic flowchart of steps of calculating motion information weights according to an embodiment.

In an embodiment, as shown in FIG. 5, the step of calculating motion information weights of the target temporal frame on the convolutional channels according to original feature submaps of the target temporal frame on the convolutional channels and original feature submaps of a next temporal frame adjacent to the target temporal frame on the convolutional channels includes the following sub-steps:

Sub-step S502: Obtain difference information between the original feature submaps of the target temporal frame and the original feature submaps of the next temporal frame on the convolutional channels.

The difference information can describe an action change degree of the moving object in image data of the two temporal frames, that is, information relevant to an action of the moving object. As described above, image data of each temporal frame obtained from the video data includes information that is critical for action recognition, and also includes noise information that is useless or even counter-productive for action recognition. However, in image data of a single temporal frame, both the moving object and background information are static, and motion is a process of an action change, so that it is difficult to obtain action information of the moving object merely according to the image data of the single temporal frame. The difference information between the original feature submaps of the image data of the target temporal frame on the convolutional channels and the original feature submaps of the image data of the next temporal frame of the target temporal frame on the corresponding convolutional channels is the action change of the moving object in the previous and next temporal frames. By obtaining the difference information between the original feature submaps of the previous and next temporal frames on corresponding convolutional channels, motion information included in the original feature submaps of the image data of the target temporal frame on the convolutional channels can be obtained.

It may be understood that a larger amount of difference information between an original feature submap of the image data of the target temporal frame on a convolutional channel and an original feature submap of the image data of the next temporal frame of the target temporal frame on the corresponding convolutional channel indicates that the original feature submap on the convolutional channel is more relevant to the action information of the moving object, and the original feature submap includes more feature information relevant to motion. Otherwise, it indicates that the original feature submap on the convolutional channel is more irrelevant to the action information of the moving object, and the original feature submap includes less feature information relevant to motion.

Specifically, the difference information between the original feature submaps of the target temporal frame and the original feature submaps of the next temporal frame on the convolutional channels may be specifically obtained by calculating differences between the original feature submaps of the image data of the target temporal frame on the convolutional channels and the original feature submaps of the image data of the next temporal frame of the target temporal frame on the corresponding convolutional channels.

Sub-step S504: Map the difference information on the convolutional channels into the motion information weights of the target temporal frame on the convolutional channels by using an activation function.

After the difference information between the original feature submaps of the target temporal frame and the original feature submaps of the next temporal frame on the convolutional channels is obtained, motion information weights on the corresponding convolutional channels may be obtained according to the difference information on the convolutional channels by using the activation function. As described above, a larger amount of difference information between an original feature submap of the image data of the target temporal frame on a convolutional channel and an original feature submap of the image data of the next temporal frame of the target temporal frame on the corresponding convolutional channel indicates a larger motion information weight of the original feature submap on the convolutional channel. Otherwise, it indicates that the original feature submap on the convolutional channel is more irrelevant to the action information of the moving object, and the motion information weight of the original feature submap on the convolutional channel is smaller.

Specifically, the activation function may be a Sigmoid function. After the difference information between the original feature submaps of the target temporal frame and the original feature submaps of the next temporal frame on the convolutional channels is obtained, the difference information on the convolutional channels may be mapped into weight values of 0 to 1 by using the Sigmoid function, to obtain motion information weights of the original feature submaps of the target temporal frame on the channels.

Figure 6A:
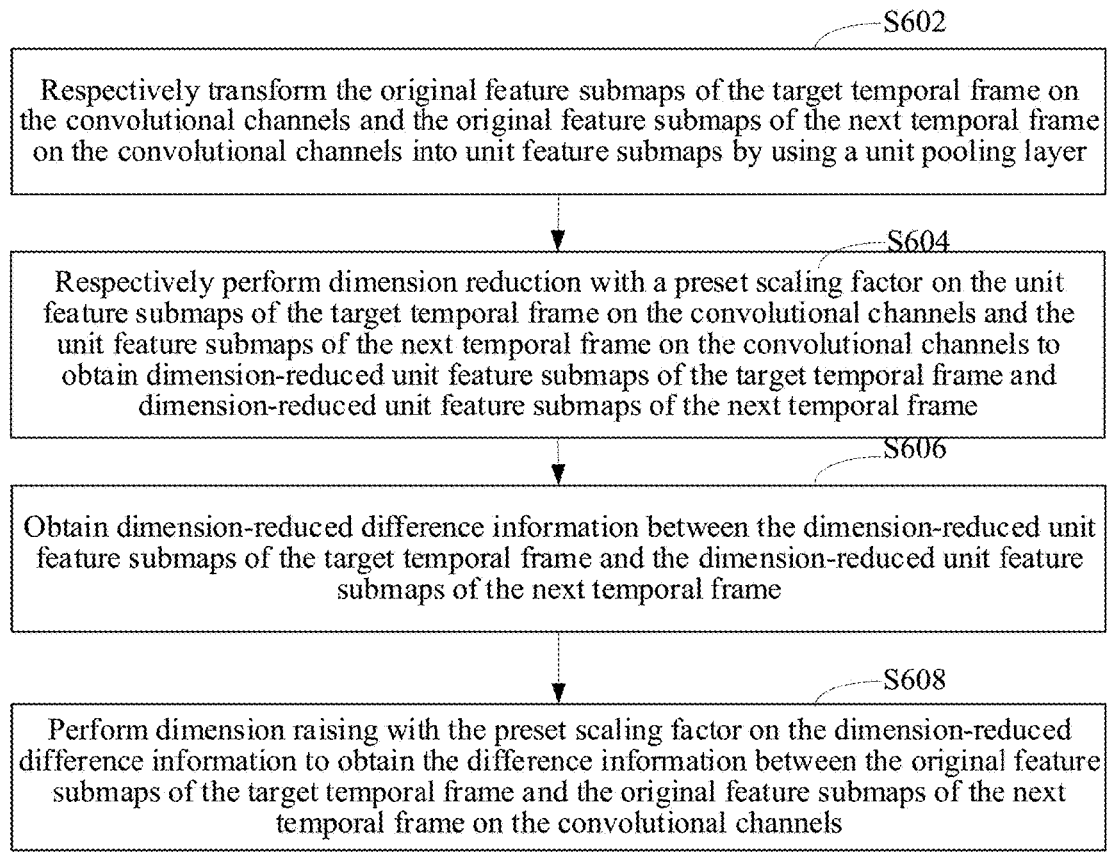
FIG. 6A is a schematic flowchart of steps of obtaining difference information according to an embodiment.

In an embodiment, as shown in FIG. 6A, the step of obtaining difference information between the original feature submaps of the target temporal frame and the original feature submaps of the next temporal frame on the convolutional channels includes the following sub-steps:

Sub-step S602: Respectively transform, by using a unit pooling layer, the original feature submaps of the target temporal frame on the convolutional channels into unit feature submaps of the target temporal frame, and the original feature submaps of the next temporal frame on the convolutional channels into unit feature submaps of the temporal frame.

The unit pooling layer refers to a pooling layer configured to perform dimension reduction on original feature submaps. Optionally, the unit pooling layer may include an average pooling layer, for example, a global average pooling layer.

The unit feature submap refers to a feature map with a length of 1 and a width of 1. Specifically, an original feature submap with a space size of H*W may be subjected to dimension reduction to become a unit feature submap with a space size of 1*1 by using the unit pooling layer. It is to be understood that in this case, the dimension on the convolutional channels is unchanged. That is, a quantity of convolutional channels of the obtained unit feature submaps is equal to a quantity of the convolutional channels of the original feature submaps.

Sub-step S604: Respectively perform dimension reduction with a preset scaling factor on the unit feature submaps of the target temporal frame on the convolutional channels and the unit feature submaps of the next temporal frame on the convolutional channels to obtain dimension-reduced unit feature submaps of the target temporal frame and dimension-reduced unit feature submaps of the next temporal frame.

The preset scaling factor is set according to an actual situation, and may be determined according to a ratio of a quantity of the original feature submaps in the dimension of the convolutional channels to a quantity of unit feature submaps after convolutional channel dimension reduction in the dimension of the convolutional channels. For example, the quantity of the original feature submaps in the dimension of the convolutional channels is 265, and after convolutional channel dimension reduction, the quantity of the unit feature submaps in the dimension of the convolutional channels is 16, then the preset scaling factor is 16.

After unit feature submaps of the target temporal frame on the convolutional channels and unit feature submaps of the next temporal frame on the convolutional channels are obtained, a quantity of unit feature submaps corresponding to the target temporal frame and the next temporal frame in the dimension of the convolutional channels may be decreased by using a dimension reduction convolutional layer. A size of convolution kernels in the dimension reduction convolutional layer is 1*1, and a quantity of the convolution kernels is equal to the quantity of the unit feature submaps that need to be obtained after dimension reduction in the dimension of the convolutional channels.

For example, a space size of original feature submaps of the temporal frames is H*W; a quantity of the original feature submaps in the dimension of the convolutional channels is C, that is, C original feature submaps with a space size of H*W are included; and a data dimension of original feature submaps of the image data of the temporal frames is C*H*W. A quantity of unit feature submaps obtained after processing of the unit pooling layer in the dimension of the convolutional channels is unchanged, and a space size is subjected to dimension reduction to become 1*1, that is, the data dimension of the unit feature submaps is (C*1*1). Subsequently, dimension reduction is performed on the dimension of the convolutional channels by using the dimension reduction convolutional layer, to decrease the quantity of the unit feature submaps in the dimension of the convolutional channels to (C/r), and a data dimension (C/r*1*1) of the dimension-reduced unit feature submaps is obtained, r being a scaling factor.

Sub-step S606: Obtain dimension-reduced difference information between dimension-reduced difference information between the dimension-reduced unit feature submaps of the target temporal frame and the dimension-reduced unit feature submaps of the next temporal frame.

Specifically, the dimension-reduced difference information between the dimension-reduced unit feature submaps of the target temporal frame and the dimension-reduced unit feature submaps of the next temporal frame may be specifically obtained by calculating differences between the dimension-reduced unit feature submaps of the target temporal frame and the dimension-reduced unit feature submaps of the next temporal frame on the corresponding convolutional channels.

Sub-step S608: Perform dimension raising with the preset scaling factor on the dimension-reduced difference information to obtain the difference information between the original feature submaps of the target temporal frame and the original feature submaps of the next temporal frame on the convolutional channels.

After the dimension-reduced difference information is obtained, an amount of the dimension-reduced difference information in the dimension of the convolutional channels may be restored to be consistent with a quantity of the convolutional channels of the original feature submaps by using a dimension raising convolutional layer. A size of convolution kernels in the dimension raising convolutional layer is 1*1, and a quantity of the convolution kernels is equal to the quantity of the convolutional channels of the original feature submaps.

In this embodiment, after transforming the original feature submaps of the target temporal frame on the convolutional channels and the original feature submaps of the next temporal frame on the convolutional channels into unit feature submaps by using the unit pooling layer, and performing dimension reduction with the preset scaling factor on the obtained unit feature submaps in the dimension of the convolutional channels, the quantity of the dimension-reduced unit feature submaps is greatly decreased relative to the quantity of the original feature submaps, so as to transform calculation on difference information between the original feature submaps of the target temporal frame and the original feature submaps of the next temporal frame on the convolutional channels into calculation on difference information between the dimension-reduced unit feature submaps of the target temporal frame and the dimension-reduced unit feature submaps of the next temporal frame, thereby effectively reducing a calculation amount, and improving a calculation speed.

Figure 6B:
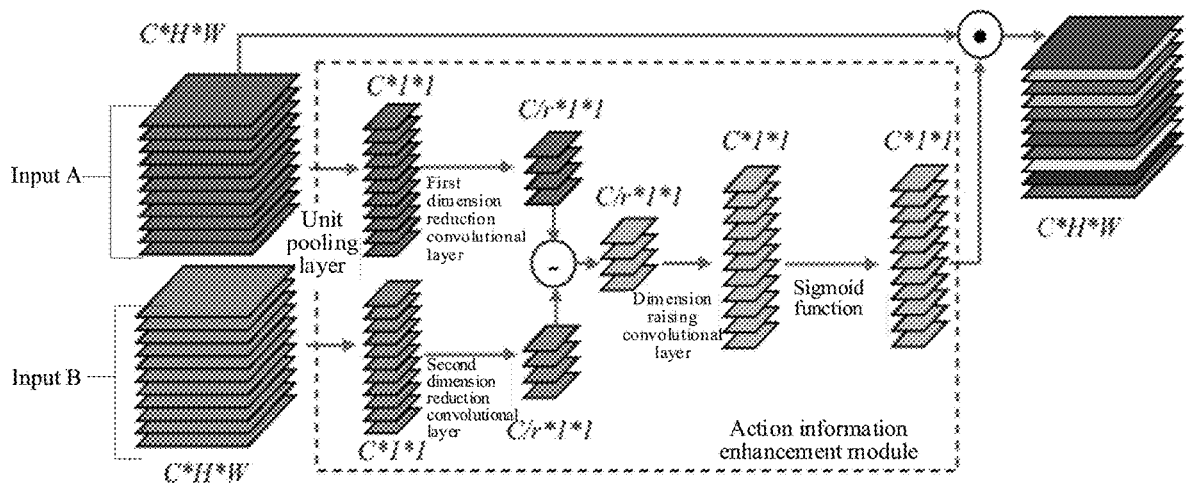
FIG. 6B is a schematic diagram of calculating motion information weights according to an embodiment.

The action recognition network model shown in FIG. 2 is used as an example. The steps shown in FIG. 5 and FIG. 6 may be performed by the action information enhancement module. FIG. 6B is a schematic diagram of calculating motion information weights of the target temporal frame on the convolutional channels according to an embodiment. An input A and an input B in FIG. 6 respectively represent the original feature submaps of the target temporal frame and the original feature submaps of the next temporal frame. Data dimensions of the input A and the input B are both C*H*W, where H and W respectively identify a length and a width of the original feature submap, and C represents a quantity of the original feature submaps in the dimension of the convolutional channels, that is, either of the input A and the input B includes C original feature submaps with a space size of H*W on the convolutional channels. To reduce a calculation amount of the module, dimension reduction is first separately performed on spatial dimensions of the original feature submaps in the input A and the original feature submaps in the input B by using the unit pooling layer, to obtain C unit feature submaps with a space size of 1*1 on the convolutional channels. Subsequently, dimension reduction is performed on unit feature submaps corresponding to the input A in the dimension of the convolutional channels by using a first dimension reduction pooling layer, and a data dimension of the dimension-reduced unit feature submaps is C/r*1*1. Similarly, dimension reduction is performed on unit feature submaps corresponding to the input B in the dimension of the convolutional channels by using a second dimension reduction pooling layer, and a data dimension of the dimension-reduced unit feature submaps is also C/r*1*1. It may be understood that network parameters of the first dimension reduction pooling layer and the second dimension reduction pooling layer are consistent. Subsequently, the dimension-reduced unit feature submaps (whose data dimension is C/r*1*1) of one the two temporal frames, namely, the input A and the input B, is subtracted from the dimension-reduced unit feature submaps (whose data dimension is C/r*1*1) of the other, to obtain dimension-reduced difference information representing motion information, where a data dimension of the dimension-reduced difference information is C/r*1*1; and then a quantity in the dimension of the convolutional channels is restored to be consistent with the quantity of the convolutional channels of the original feature submaps by using the dimension raising convolutional layer, to obtain difference information whose data dimension is C*1*1. Finally, difference information corresponding to each convolutional channel is mapped into a motion information weight with a data value of 0 to 1 by using a sigmoid function. Subsequently, the motion information weight of each convolutional channel is multiplied by an original feature submap of the corresponding convolutional channel, so that feature information of original feature submaps of some convolutional channels is enhanced to different degrees, and feature information of original feature submaps of the remaining convolutional channels are suppressed to different degrees, to enhance feature information relevant to motion information in the original feature submaps of the target temporal frame by using feature information of the next temporal frame. It is to be understood that because the last temporal frame has no next frame, the last temporal frame cannot be enhanced by using feature information in an original feature submap of a next temporal frame. That is, a motion information feature map is consistent with an original feature submap.

In an embodiment, as shown in FIG. 7, the step of performing temporal convolution on the motion information feature maps of the target temporal frame on the convolutional channels to obtain temporal motion feature maps of the target temporal frame on the convolutional channels includes the following sub-steps:

Sub-step S702: Separately obtain motion information feature maps of a preceding temporal frame adjacent to the target temporal frame on the convolutional channels and motion information feature maps of the next temporal frame adjacent to the target temporal frame on the convolutional channels.

Sub-step S704: Perform, for each of the convolutional channels, a convolution operation on a motion information feature maps of the target temporal frame, a motion information feature map of the preceding temporal frame, and a motion information feature map of the next temporal frame on a same convolutional channel by using a temporal convolution kernel, to obtain the temporal motion feature maps of the target temporal frame on the convolutional channels.

The motion information feature maps of the preceding temporal frame on the convolutional channels and the motion information feature maps of the next temporal frame on the convolutional channels are separately obtained, and then, for each convolution channel, a convolution operation is performed on one of the motion information feature maps of the target temporal frame, one of the motion information feature maps of the preceding temporal frame, and one of the motion information feature maps of the next temporal frame on the same convolutional channel by using the temporal convolution kernel, to obtain a temporal motion feature map of the target temporal frame on said convolutional channel. Accordingly, temporal motion feature maps of the target temporal frame on all the convolutional channels can be obtained, so that the temporal motion feature maps are fused with motion information feature maps of the preceding and next temporal frames, that is, action information of the moving object, thereby implementing modeling in the temporal dimension.

It is to be understood that a method for obtaining motion information feature maps of the preceding temporal frame on the convolutional channels and motion information feature maps of the next temporal frame on the convolutional channels is the same as the method for obtaining the motion information feature maps of the target temporal frame on the convolutional channels. For example, the target temporal frame is the $(t)^{th}$ frame, and the preceding temporal frame adjacent to the target temporal frame is the $(t-1)^{th}$ frame, so that motion information weights of the $(t-1)^{th}$ frame on the convolutional channels are calculated according to original feature submaps of the $(t-1)^{th}$ frame on the convolutional channels and original feature submaps of the $(t)^{th}$ frame on the convolutional channels, and then motion information feature maps of the $(t-1)^{th}$ frame on the convolutional channels are obtained according to the motion information weights of the $(t-1)^{th}$ frame on the convolutional channels and the original feature submaps of the $(t-1)^{th}$ frame on the convolutional channels. Similarly, the next temporal frame adjacent to the target temporal frame is the $(t+1)^{th}$ frame, so that motion information weights of the $(t+1)^{th}$ frame on the convolutional channels are calculated according to original feature submaps of the $(t+1)^{th}$ frame on the convolutional channels and original feature submaps of the $(t+2)^{th}$ frame on the convolutional channels, and then motion information feature maps of the $(t+1)^{th}$ frame on the convolutional channels are obtained according to the motion information weights of the $(t+1)^{th}$ frame on the convolutional channels and the original feature submaps of the $(t+1)^{th}$ frame on the convolutional channels.

The second temporal frame shown in FIG. 2 is used as an example. The foregoing step of performing a convolution operation on motion information feature maps of the target temporal frame, the preceding temporal frame, and the next temporal frame on the same convolutional channel by using a temporal convolution kernel, to obtain the temporal motion feature maps of the target temporal frame on the convolutional channels may be performed by the action information enhancement module. Specifically, as shown in FIG. 4, the third temporal frame in the figure is used as a target temporal frame, then a convolution operation is performed on motion information feature maps of the second temporal frame, the third temporal frame, and the fourth temporal frame on the first convolutional channel by using a 3*1 convolution kernel, to obtain a temporal motion feature map of the third temporal frame on the first convolutional channel. Similarly, a convolution operation is performed on motion information feature maps of the second temporal frame, the third temporal frame, and the fourth temporal frame on the second convolutional channel by using a 3*1 convolution kernel, to obtain a temporal motion feature map of the third temporal frame on the second convolutional channel. By analogy, temporal motion feature maps of the third temporal frame on the convolutional channels are obtained. For any temporal frame, previous and next temporal frames adjacent to the temporal frame may be used to perform a convolution operation in the temporal dimension on the convolutional channels, so that temporal motion feature maps obtained through the operation are fused with motion information feature maps of the previous and next temporal frames, that is, action information of the moving object.

In an embodiment, as shown in FIG. 8A, the step of recognizing an action type of a moving object in image data of the target temporal frame according to the temporal motion feature maps of the target temporal frame on the convolutional channels includes the following sub-steps:

Sub-step S802: Input the temporal motion feature maps of the target temporal frame into a residual network layer, to obtain action feature information of the image data of the target temporal frame.

The residual network layer is configured to obtain temporal motion feature maps for further feature learning, to obtain action feature information that can better represent the action type of the moving object.

Specifically, after the temporal motion feature maps of the target temporal frame on the convolutional channels are obtained, the temporal motion feature maps of the target temporal frame on the convolutional channels are inputted into the residual network layer as feature information of the image data of the target temporal frame, and the residual network layer performs feature learning on the temporal motion feature maps, to obtain action feature information of the image data. An amount of the action feature information in the dimension of the convolutional channels may be consistent with a quantity of the temporal motion feature maps.

Sub-step S804: Input the action feature information into an action classification network layer, to recognize the action type of the moving object in the image data of the target temporal frame.

The action classification network layer is a network structure configured to perform action type recognition according to the action feature information of the image data. The action classification network layer herein is a trained action classification network layer, and may be directly used to obtain the action type of the moving object in the image data. Specifically, after the action feature information of the image data of the target temporal frame is obtained, the action feature information is inputted into the action classification network layer, and the action classification network layer obtains the action type of the moving object in the image data of the target temporal frame.

The action recognition network model shown in FIG. 2 is used as an example. The step of recognizing the action type of the moving object in the image data of the target temporal frame according to the temporal motion feature maps of the target temporal frame on the convolutional channels may be performed by the backbone network layer. The residual network layer in the backbone network layer is configured to obtain temporal motion feature maps for further feature learning, to obtain action feature information that can better represent the action type of the moving object, and a pooling layer and a fully connected layer in the backbone network layer are equivalent to the action classification network layer, and are configured to recognize the action type of the moving object in the image data of the target temporal frame according to inputted action feature information. Further, in an embodiment, the network structure of the residual network layer may be shown in FIG. 8B, and includes three convolutional neural networks, which are respectively two 2D convolutional neural networks (2Dconv) with a size of 1*1 on two ends and a 2D convolutional neural network with a size of 3*3 in the middle.

In an embodiment, after the step of inputting the temporal motion feature maps of the target temporal frame into a residual network layer, to obtain action feature information of the image data of the target temporal frame, the method further includes: using the action feature information as the original feature submaps of the image data of the target temporal frame on different the convolutional channels; and performing the operation of calculating motion information weights of the target temporal frame on the convolutional channels according to original feature submaps of the target temporal frame on the convolutional channels and original feature submaps of a next temporal frame on the convolutional channels again. In some embodiments, performing the operation of calculating again includes: performing the operation of calculating again, the motion information weights of the target temporal frame on the convolutional channels according to the original feature submaps of the target temporal frame on the convolutional channels and the original feature submaps of a the next temporal frame adjacent to the target temporal frame on the convolutional channels, to obtain updated motion information weights of the target temporal frame; obtaining updated motion information feature maps of the target temporal frame on the convolutional channels according to the updated motion information weights and the original feature submaps of the target temporal frame on the convolutional channels; performing the temporal convolution on the updated motion information feature maps to obtain updated temporal motion feature maps of the target temporal frame on the convolutional channels; and recognizing again, the action type of the moving object in image data of the target temporal frame according to the updated temporal motion feature maps.

After the action feature information of the image data of the target temporal frame is obtained, the action feature information may be redetermined as original feature submaps of the image data of the target temporal frame on different convolutional channels, and then the same operations are performed on the newly determined original feature submaps again. That is, motion information weights of the original feature submaps on the convolutional channels are calculated; the motion information weights are added to the original feature submaps on the corresponding convolutional channels, to obtain motion information feature maps of the target temporal frame on the convolutional channels; and then motion information feature maps of the target temporal frame and adjacent temporal frames on the same convolutional channel are convolved by using a temporal convolution kernel, so that the motion information feature maps of the target temporal frame on the convolutional channels are fused with motion information feature maps from the adjacent temporal frames, and temporal motion feature maps of the target temporal frame on the convolutional channels are obtained.

By determining the action feature information as original feature submaps, enhancing the action feature information based on an attention mechanism again, and modeling temporal information again, the capability of the action feature information to represent action information can be effectively improved, and subsequently the action feature information is used for action recognition, thereby effectively improving the accuracy of action recognition.

The action recognition network model shown in FIG. 2 is used as an example. The action information enhancement module in the figure is configured to perform action information enhancement on original feature submaps of image data of each temporal frame on different convolutional channels, to obtain motion information feature maps of the image data of each temporal frame on different convolutional channels; the temporal interaction module in the figure is configured to perform a convolution operation on motion information feature maps of image data of adjacent temporal frames on the same convolutional channel to obtain temporal motion feature maps, the temporal motion feature map being fused with motion information of the adjacent temporal frames; and the residual network layer in the backbone network layer is configured to obtain temporal motion feature maps for further feature learning, to obtain action feature information that can better represent the action type of the moving object. The action information enhancement module, the temporal interaction module, and the residual network layer may be used as a feature extraction unit. The accuracy of feature learning is improved by using plurality of feature extraction units, thereby effectively improving the accuracy of action recognition.

Further, the action information enhancement module and the temporal interaction module may not only be applied to the application environment of action recognition on video data, but also be applied to any scenario in which video data needs to be modeled. For example, the action information enhancement module may be embedded into a neural network that models consecutive temporal frames, and according to a different application scenario, the action information enhancement module enhances feature information that is beneficial to the application scenario and suppresses noise information that is not beneficial to the application scenario in a targeted manner. The temporal interaction module may alternatively be embedded into any 2D convolutional network for modeling on temporal information, and facilitate feature learning.

Figure 9:
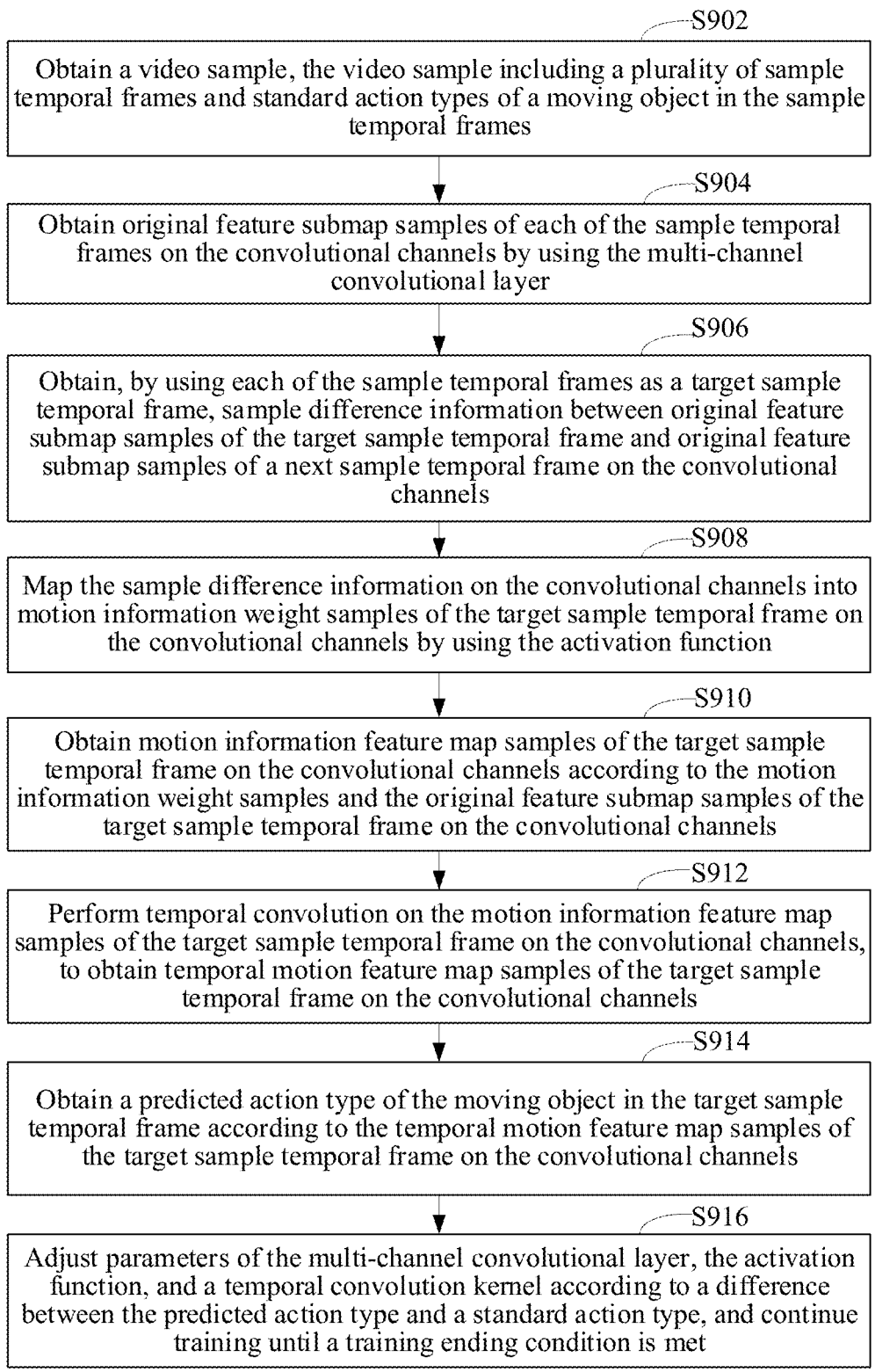
FIG. 9 is a schematic flowchart of parameter training steps according to an embodiment.

In an embodiment, as shown in FIG. 9, the action recognition method further includes the following steps:

Step S902: Obtain a video sample, the video sample including a plurality of sample temporal frames and standard action types of a moving object in the sample temporal frames. The video sample may be considered as a training video sample.

The video sample refers to a video sample used in an action recognition network model. The video sample includes a plurality of image samples of different sample temporal frames and standard action types corresponding to the image samples. A training process can be performed according to steps S904 to S916.

Step S904: Obtain original feature submap samples of each of the sample temporal frames on the convolutional channels by using the multi-channel convolutional layer.

The image samples are inputted into the multi-channel convolutional layer as input data of the multi-channel convolutional layer, and the convolution kernels in the multi-channel convolutional layer perform convolution calculation on the image samples, to obtain original feature submap samples on the convolutional channels corresponding to the convolution kernels.

Step S906: Obtain, by using each of the sample temporal frames as a target sample temporal frame, sample difference information between original feature submap samples of the target sample temporal frame and original feature submap samples of a next sample temporal frame on the convolutional channels.

The sample difference information can describe an action change degree of the moving object in image samples of the two sample temporal frames, that is, information relevant to an action of the moving object. An image sample of each sample temporal frame obtained from the video sample includes information that is critical for action recognition, and also includes noise information that is useless or even counterproductive for action recognition. However, in an image sample of a single sample temporal frame, both the moving object and background information are static, and motion is a process of an action change, so that it is difficult to obtain action information of the moving object merely according to the image sample of the single sample temporal frame. The difference information between the original feature submap samples of the image sample of the target sample temporal frame on the convolutional channels and the original feature submap samples of the image sample of the next sample temporal frame of the target sample temporal frame on the corresponding convolutional channels is the action change of the moving object in the previous and next sample temporal frames. By obtaining the sample difference information between the original feature submap samples of the previous and next sample temporal frames on corresponding convolutional channels, motion information included in the original feature submap samples of the image sample of the target sample temporal frame on the convolutional channels can be obtained.

Specifically, the sample difference information between the original feature submap samples of the target sample temporal frame and the original feature submap samples of the next sample temporal frame on the convolutional channels may be specifically obtained by calculating differences between the original feature submap samples of the image sample of the target sample temporal frame on the convolutional channels and the original feature submap samples of the image sample of the next sample temporal frame of the target sample temporal frame on the corresponding convolutional channels.

Further, data dimension reduction may be performed on the original feature submap samples of the target sample temporal frame on the convolutional channels, to obtain dimension-reduced unit feature submap samples of the target sample temporal frame, and data dimension reduction may be performed on the original feature submap samples of the next sample temporal frame on the convolutional channels, to obtain dimension-reduced unit feature submap samples of the next sample temporal frame. The quantity of the dimension-reduced unit feature submap samples is greatly decreased relative to the quantity of the original feature submap samples. By transforming calculation on sample difference information between the original feature submap samples of the target sample temporal frame and the next sample temporal frame on the convolutional channels into calculation on difference information between the dimension-reduced unit feature submap samples of the target sample temporal frame and dimension-reduced unit feature submap samples of the next sample temporal frame, a calculation amount is effectively reduced, and a calculation speed is effectively improved.

Step S908: Map the sample difference information on the convolutional channels into motion information weight samples of the target sample temporal frame on the convolutional channels by using the activation function.

After the sample difference information between the original feature submap samples of the target sample temporal frame and the original feature submap samples of the next sample temporal frame on the convolutional channels is obtained, motion information weight samples on the corresponding convolutional channels may be obtained according to the sample difference information on the convolutional channels by using the activation function. Specifically, the activation function may be a Sigmoid function. After the sample difference information between the original feature submap samples of the target sample temporal frame and the original feature submap samples of the next sample temporal frame on the convolutional channels is obtained, the sample difference information on the convolutional channels may be mapped into weight values of 0 to 1 by using the Sigmoid function, to obtain motion information weight samples of the original feature submap samples of the target sample temporal frame on the channels.

Step S910: Obtain motion information feature map samples of the target sample temporal frame on the convolutional channels according to the motion information weight samples and the original feature submap samples of the target sample temporal frame on the convolutional channels.

Step S912: Perform temporal convolution on the motion information feature map samples of the target sample temporal frame on the convolutional channels, to obtain temporal motion feature map samples of the target sample temporal frame on the convolutional channels.

After the motion information feature map samples of sample temporal frames on the convolutional channels are obtained, and a convolution operation may be performed on motion information feature map samples of the target sample temporal frame and adjacent sample temporal frames on the same convolutional channel by using the temporal convolution kernel, to obtain temporal motion feature map samples of the target sample temporal frame on the convolutional channels, so that the temporal motion feature map samples are fused with motion information feature map samples of previous and next sample temporal frames, that is, action information of the moving object, thereby implementing modeling in the temporal dimension.

Step S914: Obtain a predicted action type of the moving object in the target sample temporal frame according to the temporal motion feature map samples of the target sample temporal frame on the convolutional channels.

After the temporal motion feature map samples of the image sample of the target sample temporal frame are obtained, the temporal motion feature map samples may be used as feature information of the image sample, to obtain the action type of the moving object in the image sample of the target sample temporal frame. Specifically, the temporal motion feature map samples may be inputted into a 2D convolutional network used for action recognition, to obtain a predicted action type of the moving object in the image sample of the target sample temporal frame.

Step S916: Adjust parameters of the multi-channel convolutional layer, the activation function, and a temporal convolution kernel according to a difference between the predicted action type and a standard action type. The training process of steps S904 to S916 can be repeated until a training ending condition is met.

After the predicted action type of the image sample is obtained, the difference between the predicted action type and the standard action type may be used as a loss function, to adjust parameters of the multi-channel convolutional layer, the activation function, and the temporal convolution kernel, until the training ending condition is met. The training ending condition herein may be adjusted or set according to an actual requirement. For example, when the loss function meets a convergence condition, it can be considered that the training ending condition is met; and when a quantity of times of training reaches a preset quantity of times, it can be considered that the training ending condition is met.

In an embodiment, an action recognition method includes the following steps:

1. Obtain image data of video data in different temporal frames, and obtain original feature submaps of the image data of the temporal frames on different convolutional channels by using a multi-channel convolutional layer.
2. Calculate, by using each of the temporal frames as a target temporal frame, motion information weights of the target temporal frame on the convolutional channels according to original feature submaps of the target temporal frame on the convolutional channels and original feature submaps of a next temporal frame adjacent to the target temporal frame on the convolutional channels.
   2-1: Obtain difference information between the original feature submaps of the target temporal frame and the original feature submaps of the next temporal frame on the convolutional channels.
      2-1-1: Respectively transform the original feature submaps of the target temporal frame on the convolutional channels and the original feature submaps of the next temporal frame on the convolutional channels into unit feature submaps by using a unit pooling layer.
      2-1-2: Respectively perform dimension reduction with a preset scaling factor on unit feature submaps of the target temporal frame on the convolutional channels and unit feature submaps of the next temporal frame on the convolutional channels to obtain dimension-reduced unit feature submaps.
      2-1-3: Obtain dimension-reduced difference information between dimension-reduced unit feature submaps of the target temporal frame and dimension-reduced unit feature submaps of the next temporal frame.
      2-1-4: Perform dimension raising with the preset scaling factor on the dimension-reduced difference information to obtain the difference information between the original feature submaps of the target temporal frame and the original feature submaps of the next temporal frame on the convolutional channels.
   2-2: Map the difference information on the convolutional channels into the motion information weights of the target temporal frame on the convolutional channels by using an activation function.

3. Obtain motion information feature maps of the target temporal frame on the convolutional channels according to the motion information weights of the target temporal frame on the convolutional channels and the original feature submaps of the target temporal frame on the convolutional channels.

4. Perform temporal convolution on the motion information feature maps of the target temporal frame on the convolutional channels to obtain temporal motion feature maps of the target temporal frame on the convolutional channels.

4-1: Separately obtain motion information feature maps of a preceding temporal frame adjacent to the target temporal frame on the convolutional channels and motion information feature maps of the next temporal frame adjacent to the target temporal frame on the convolutional channels.

4-2: Perform a convolution operation on motion information feature maps of the target temporal frame, the preceding temporal frame, and the next temporal frame on the same convolutional channel by using a temporal convolution kernel, to obtain the temporal motion feature maps of the target temporal frame on the convolutional channels.

5. Recognize an action type of a moving object in image data of the target temporal frame according to the temporal motion feature maps of the target temporal frame on the convolutional channels.

5-1: Input the temporal motion feature maps of the target temporal frame into a residual network layer, to obtain action feature information of the image data of the target temporal frame.

5-2: Input the action feature information into an action classification network layer, to recognize the action type of the moving object in the image data of the target temporal frame.

6. Determine, after action types of the moving object in the image data of the temporal frames are obtained, an action type of the video data according to the action types of the temporal frames.

Figure 10:
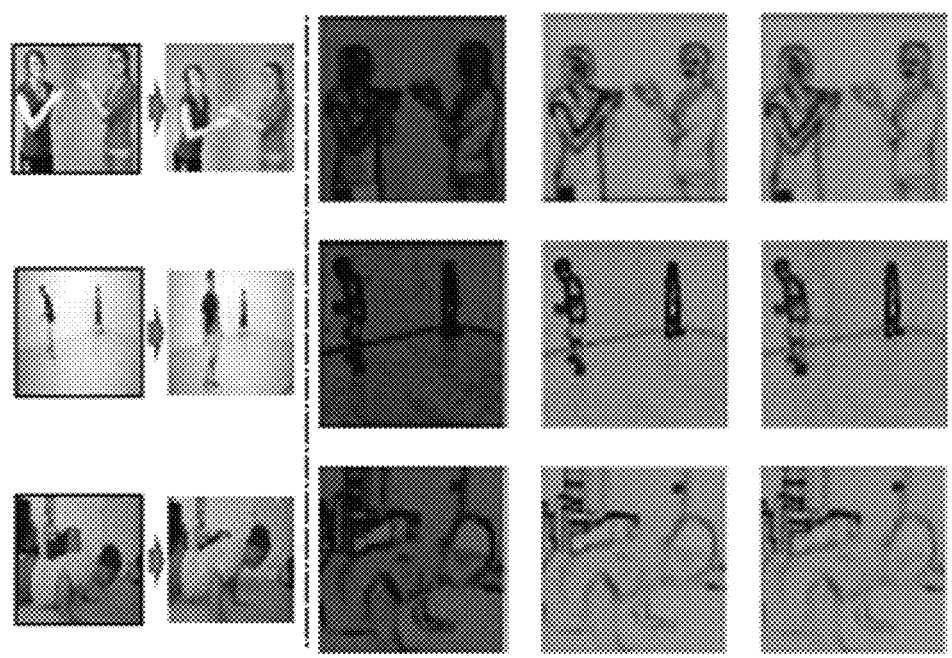
FIG. 10 is a visualized schematic diagram of original feature submaps, motion information feature maps, and temporal motion feature maps according to an embodiment.

Further, the action recognition method is further described with reference to the action recognition network model shown in FIG. 2 and FIG. 10. In FIG. 10, the left column is image data of two temporal frames obtained from a video in chronological order. In the left part, the first column of image data is image data of the target temporal frame, and the second column of image data is image data of the next temporal frame; and in the right part, the first column of images are visualization of the original feature submaps corresponding to the image data of the target temporal frame in the left part, the second column of images are visualization of motion information feature maps obtained after processing on the original feature submaps by the action information enhancement module, and the third column of images are visualization of temporal motion feature maps obtained after processing on the motion information feature maps by the temporal interaction module. It can be learned from FIG. 10 that the original feature submaps include both information that is critical for action recognition, and also include noise information that is useless or even counterproductive for action recognition, where there is a relatively large amount of noise information, and a contour of the moving object is relatively blurry; in the motion information feature maps obtained after processing of the action information enhancement module, the contour of the moving object becomes clear, and background noise information that is irrelevant to the action information is consistent to some degree; and the temporal motion feature maps obtained after processing of the temporal interaction module not only include information of the image data of the target temporal frame in the first column in the left part, but also includes information of the image data of the next temporal frame in the second column in the left part, thereby achieving an objective of modeling on temporal information.

Further, the operation processes for data in step 2 to step 4 are performed in the dimension of the convolutional channels. Feature maps (including original feature submaps and motion information feature maps) on different convolutional channels are independent of each other, and information of feature maps on adjacent convolutional channels will not be mixed, so that the calculation process is maintained at a small calculation amount and a relatively high calculation speed. Similarly, both the action information enhancement module and the temporal interaction module in FIG. 2 perform operations on the convolutional channels. That is, for feature maps (original feature submaps or motion information feature maps) of a single or a plurality of temporal frames on the convolutional channels, feature maps on different convolutional channels are independent of each other, and information of feature maps on adjacent convolutional channels will not be mixed, so that the calculation process is maintained at a small calculation amount and a relatively high calculation speed.

Figure 11:
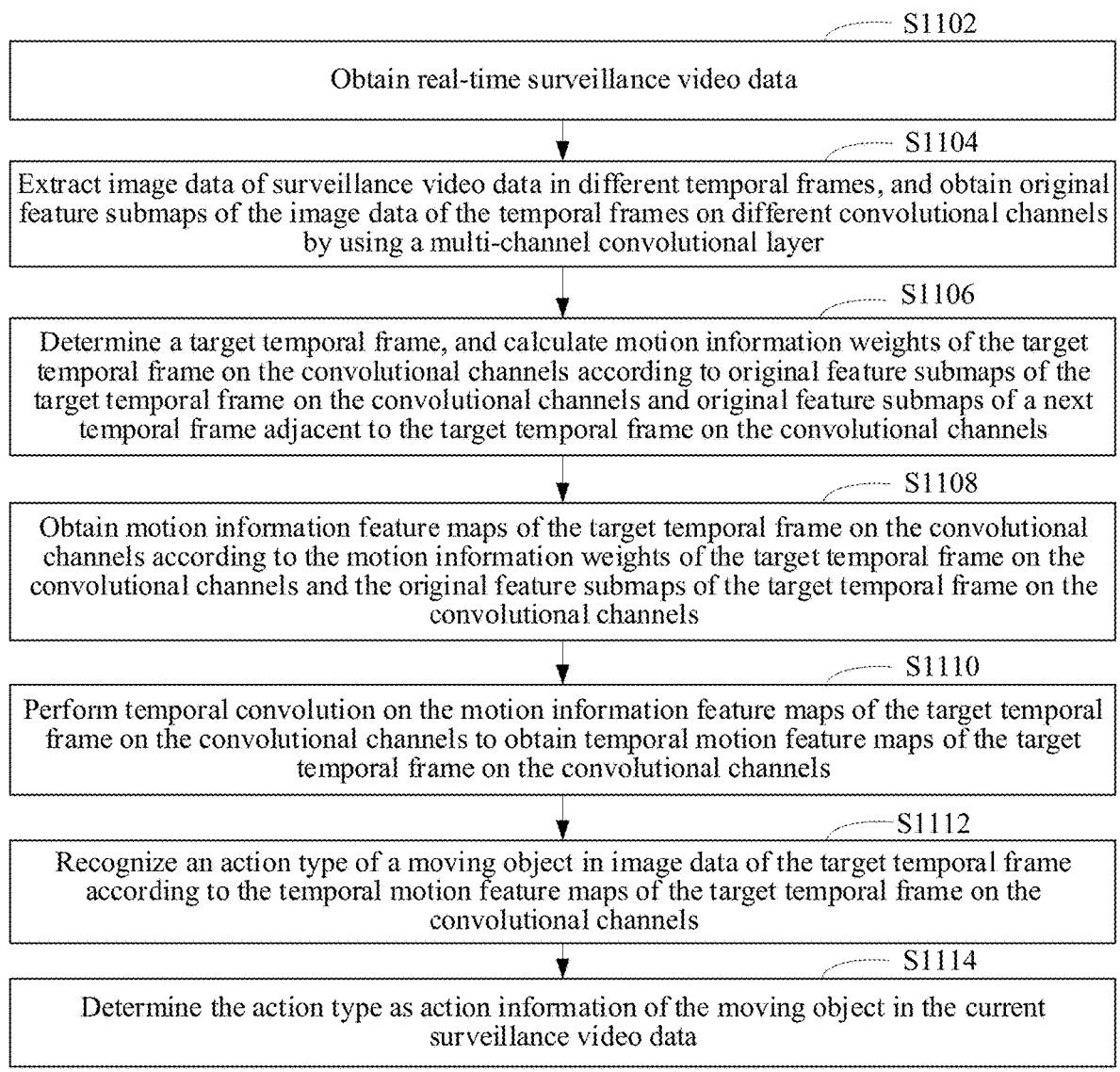
FIG. 11 is a schematic flowchart of an action recognition method according to another embodiment.

In an embodiment, as shown in FIG. 11, an action recognition method includes the following steps:

Step S1102: Obtain real-time surveillance video data.

This embodiment is applied to a real-time monitoring scenario, and surveillance video data obtained in real time is selected as the video data. The surveillance video data may be a real-time video captured by using a camera, and images of the surveillance video data include a monitored moving object.

Step S1104: Extract image data of surveillance video data in different temporal frames, and obtain original feature submaps of the image data of the temporal frames on different convolutional channels by using a multi-channel convolutional layer. In some embodiments, the surveillance video data can be considered as the video data in S302, and the image data of the surveillance video data can be extracted as the image data in the plurality of temporal frames. Accordingly, steps S302 to S310 can be performed to recognize an action type of a moving object in a target temporal frame of the surveillance video data.

The image data of different temporal frames refers to image data extracted from the surveillance video data in chronological order of capturing, and includes image data of all the temporal frames in the surveillance video data. The image data of the video data in different temporal frames may be specifically obtained according to an arrangement order of the image data in the video data.

The original feature submap refers to feature information representing image data. The multi-channel convolutional layer refers to a network model configured to obtain feature information in image data, and the multi-channel convolutional layer herein is a trained network model, which may be directly used to obtain feature information of image data. The multi-channel convolutional layer includes a plurality of convolution kernels. The convolutional channels are determined by the multi-channel convolutional layer. A quantity of convolution kernels in the multi-channel convolutional layer that are configured to extract image data is a quantity of the convolutional channels. Specifically, the image data of the temporal frames in the surveillance video is separately inputted into the multi-channel convolutional layer as input data of the multi-channel convolutional layer, and the convolution kernels in the multi-channel convolutional layer perform convolution calculation on the image data, to obtain original feature submaps on the convolutional channels corresponding to the convolution kernels.

Step S1106: Determine a target temporal frame, and calculate motion information weights of the target temporal frame on the convolutional channels according to original feature submaps of the target temporal frame on the convolutional channels and original feature submaps of a next temporal frame adjacent to the target temporal frame on the convolutional channels.

The target temporal frame refers to a temporal frame corresponding to image data obtained at the current time point, and the next temporal frame refers to a temporal frame corresponding to a next time point relative to the target temporal frame.

Image data of each temporal frame obtained from the surveillance video data includes information that is critical for action recognition, for example, apparent information of the moving object; and also includes noise information that is useless or even counterproductive for action recognition, for example, noise or background information in the image data. After the correlations between the original feature submaps of the image data of the target temporal frame on different convolutional channels and the action information of the moving object, that is, the motion information weights are obtained, by increasing feature information included in an original feature submap that is more relevant to the action information of the moving object, that is, allocating more attention for the original feature submap on the convolutional channel, and suppressing an original feature submap that includes less action information of the moving object or includes more noise information, that is, allocating less attention for the original feature submap on the convolutional channel, information that is beneficial to action recognition is enhanced and information that is irrelevant or even harmful to action recognition is suppressed, thereby effectively improving the accuracy of action recognition.

Because in image data of a single temporal frame, both the moving object and background information are static, and motion is a process of an action change, an action change process of the moving object needs to be described by using the image data of the target temporal frame and image data of the next temporal frame of the target temporal frame, to improve the accuracy of action recognition. After original feature submaps of image data of each temporal frame on the convolutional channels are obtained, the image data of the each temporal frame is used as image data of the target temporal frame, to obtain motion information weights corresponding to the original feature submaps of the target temporal frame on the convolutional channels according to the original feature submaps of the image data of the target temporal frame on different convolutional channels and original feature submaps of image data of a next temporal frame of the target temporal frame on different convolutional channels.

Specifically, the obtaining motion information weights included in the original feature submaps of the target temporal frame on the convolutional channels may be specifically that: differences between the original feature submaps of the image data of the target temporal frame on the convolutional channels and the original feature submaps of the image data of the next temporal frame of the target temporal frame on corresponding convolutional channels are first calculated, and then the corresponding motion information weights of the image data of the target temporal frame on the convolutional channels are determined according to the differences between the original feature submaps on the convolutional channels.

Step S1108: Obtain motion information feature maps of the target temporal frame on the convolutional channels according to the motion information weights of the target temporal frame on the convolutional channels and the original feature submaps of the target temporal frame on the convolutional channels.

Step S1110: Perform temporal convolution on the motion information feature maps of the target temporal frame on the convolutional channels to obtain temporal motion feature maps of the target temporal frame on the convolutional channels.

The performing temporal convolution on the motion information feature maps of the target temporal frame on the convolutional channels may be specifically that: to-be-convolved temporal frames are determined according to the target temporal frame, and motion information feature maps of the target temporal frame and the to-be-convolved temporal frames on the same convolutional channel are convolved, to obtain temporal motion feature maps of the target temporal frame on the convolutional channels, so that the temporal motion feature maps are fused with motion information feature maps of previous and next temporal frames, that is, action information of the moving object in time, thereby implementing modeling in the temporal dimension. A method for obtaining motion information feature maps of the to-be-convolved temporal frames on the convolutional channels is the same as the method for obtaining the motion information feature maps of the target temporal frame on the convolutional channels.

Step S1112: Recognize an action type of a moving object in image data of the target temporal frame according to the temporal motion feature maps of the target temporal frame on the convolutional channels.

After the temporal motion feature maps of the image data of the target temporal frame are obtained, the temporal motion feature maps may be determined as feature information of the image data of the target temporal frame, and the action type of the moving object in the image data of the target temporal frame is recognized according to the feature information. Specifically, the temporal motion feature maps may be inputted into a 2D convolutional network used for action recognition, to recognize the action type of the moving object in the image data of the target temporal frame. The temporal motion feature maps includes both information that is relatively highly relevant to motion and temporal information, so that using the temporal motion feature maps to perform action recognition can effectively improve the accuracy of action recognition.

Step S1114: Determine the action type as action information of the moving object in the current surveillance video data.

After the action type of the moving object in the image data of the target temporal frame is obtained, the action type is determined as action information of the moving object in the surveillance video data, to update the action information of the moving object in real time, so that the action information of the moving object can be obtained without watching the surveillance video, and real-time monitoring on the moving object is ensured.

Further, the action information may be displayed by using a display apparatus, to enable a monitoring person to obtain a motion state of the moving object in the surveillance video.

An example in which a to-be-monitored object is a person is used. It is assumed that the monitored person is performing a striding action. A target temporal frame captured at the current time point and a next temporal frame adjacent to the target temporal frame are obtained from the real-time surveillance video data; motion information weights of the target temporal frame on convolutional channels are obtained according to original feature submaps of the target temporal frame and the next temporal frame on the convolutional channels; the motion information weights are added to original feature submaps of the target temporal frame on the corresponding convolutional channels, to obtain motion information feature maps of the target temporal frame on the convolutional channels; to-be-convolved temporal frames are then determined according to the target temporal frame, so as to convolve motion information feature maps of the to-be-convolved temporal frames on the same convolutional channel, to obtain temporal motion feature maps of the target temporal frame on the convolutional channels; and finally the temporal motion feature maps of the target temporal frame on the convolutional channels are used as feature information of image data of the target temporal frame for action recognition, to obtain an action type of the monitored person in the image data of the target temporal frame. In this case, the action type of the monitored person is a striding action type, and the action type is determined as action information of the monitored person.

It is to be understood that although the steps in the flowchart are sequentially shown according to indication of an arrow, the steps are not necessarily sequentially performed according to a sequence indicated by the arrow. Unless otherwise explicitly specified in this specification, execution of the steps is not strictly limited, and the steps may be performed in other sequences. Besides, at least some steps in the flowchart may include a plurality of sub-steps or a plurality of stages, the sub-steps or stages are not necessarily performed at a same moment and may be performed at different moments, the sub-steps or stages are not necessarily sequentially performed, but may be performed in turn or alternately with other steps or at least some sub-steps or stages of other steps.

Figure 12:
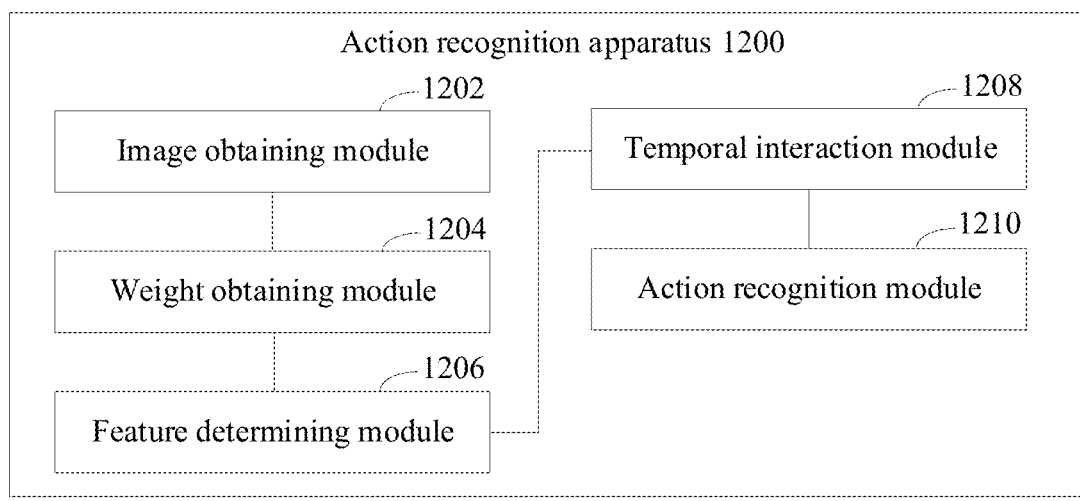
FIG. 12 is a structural block diagram of an action recognition apparatus according to an embodiment.

In an embodiment, as shown in FIG. 12, an action recognition apparatus 1200 is provided, disposed in a computer device. The apparatus includes: an image obtaining module 1202, a weight obtaining module 1204, a feature determining module 1206, a temporal interaction module 1208, and an action recognition module 1210.

The image obtaining module 1202 is configured to: obtain image data of video data in different temporal frames, and obtain original feature submaps of the image data of the temporal frames on different convolutional channels by using a multi-channel convolutional layer.

The weight obtaining module 1204 is configured to: calculate, by using each of the temporal frames as a target temporal frame, motion information weights of the target temporal frame on the convolutional channels according to original feature submaps of the target temporal frame on the convolutional channels and original feature submaps of a next temporal frame adjacent to the target temporal frame on the convolutional channels.

The feature determining module 1206 is configured to obtain motion information feature maps of the target temporal frame on the convolutional channels according to the motion information weights of the target temporal frame on the convolutional channels and the original feature submaps of the target temporal frame on the convolutional channels.

The temporal interaction module 1208 is configured to perform temporal convolution on the motion information feature maps of the target temporal frame on the convolutional channels to obtain temporal motion feature maps of the target temporal frame on the convolutional channels.

The action recognition module 1210 is configured to recognize an action type of a moving object in image data of the target temporal frame according to the temporal motion feature maps of the target temporal frame on the convolutional channels.

Figure 13:
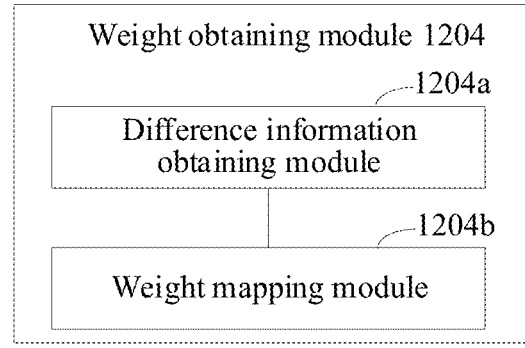
FIG. 13 is a structural block diagram of a weight obtaining module according to an embodiment.

In an embodiment, as shown in FIG. 13, the weight obtaining module 1204 includes:
a difference information obtaining module 1204a, configured to obtain difference information between the original feature submaps of the target temporal frame and the original feature submaps of the next temporal frame on the convolutional channels; and
a weight mapping module 1204b, configured to map the difference information on the convolutional channels into the motion information weights of the target temporal frame on the convolutional channels by using an activation function.

In an embodiment, the difference information obtaining module is configured to: respectively transform the original feature submaps of the target temporal frame on the convolutional channels and the original feature submaps of the next temporal frame on the convolutional channels into unit feature submaps by using a unit pooling layer; respectively perform dimension reduction with a preset scaling factor on unit feature submaps of the target temporal frame on the convolutional channels and unit feature submaps of the next temporal frame on the convolutional channels to obtain dimension-reduced unit feature submaps; obtain dimension-reduced difference information between dimension-reduced unit feature submaps of the target temporal frame and dimension-reduced unit feature submaps of the next temporal frame; and perform dimension raising with the preset scaling factor on the dimension-reduced difference information to obtain the difference information between the original feature submaps of the target temporal frame and the original feature submaps of the next temporal frame on the convolutional channels.

In an embodiment, the temporal interaction module is configured to: separately obtain motion information feature maps of a preceding temporal frame adjacent to the target temporal frame on the convolutional channels and motion information feature maps of the next temporal frame adjacent to the target temporal frame on the convolutional channels; and perform a convolution operation on motion information feature maps of the target temporal frame, the preceding temporal frame, and the next temporal frame on the same convolutional channel by using a temporal convolution kernel, to obtain the temporal motion feature maps of the target temporal frame on the convolutional channels.

In an embodiment, the action recognition module is configured to: input the temporal motion feature maps of the target temporal frame into a residual network layer, to obtain action feature information of the image data of the target temporal frame; and input the action feature information into an action classification network layer, to recognize the action type of the moving object in the image data of the target temporal frame.

In an embodiment, the temporal interaction module is further configured to: determine the action feature information as original feature submaps of the image data of the target temporal frame on different convolutional channels; and cause the weight obtaining module 1104 to perform the step of calculating motion information weights of the target temporal frame on the convolutional channels according to original feature submaps of the target temporal frame on the convolutional channels and original feature submaps of a next temporal frame adjacent to the target temporal frame on the convolutional channels again.

In an embodiment, the action recognition module is further configured to: determine, after action types of the moving object in the image data of the temporal frames are obtained, an action type of the video data according to the action types of the temporal frames.

In an embodiment, the action recognition apparatus further includes a training module, configured to: obtain a video sample, the video sample including a plurality of image samples of different sample temporal frames and standard action types of a moving object in the image samples of the sample temporal frames; obtain original feature submap samples of the image samples on different convolutional channels by using the multi-channel convolutional layer; obtain, by using each of the sample temporal frames as a target sample temporal frame, sample difference information between original feature submap samples of the target sample temporal frame and original feature submap samples of a next sample temporal frame on the convolutional channels; map the sample difference information on the convolutional channels into motion information weight samples of the target sample temporal frame on the convolutional channels by using the activation function; obtain motion information feature map samples of the target sample temporal frame on the convolutional channels according to the motion information weight samples and the original feature submap samples of the target sample temporal frame on the convolutional channels; perform temporal convolution on the motion information feature map samples of the target sample temporal frame on the convolutional channels, to obtain temporal motion feature map samples of the target sample temporal frame on the convolutional channels; obtain a predicted action type of the moving object in an image sample of the target sample temporal frame according to the temporal motion feature map samples of the target sample temporal frame on the convolutional channels; and adjust parameters of the multi-channel convolutional layer, the activation function, and a temporal convolution kernel according to a difference between the predicted action type and a standard action type of the target sample temporal frame, and continue training until a training ending condition is met.

In an embodiment, an action recognition apparatus is provided, disposed in a computer device. The apparatus includes: an image obtaining module, a weight obtaining module, a feature determining module, a temporal interaction module, and an action recognition module.

The image obtaining module is configured to: obtain real-time surveillance video data; and extract image data of the surveillance video data in different temporal frames, and obtain original feature submaps of the image data of the temporal frames on different convolutional channels by using a multi-channel convolutional layer.

The weight obtaining module is configured to: calculate, by using each of the temporal frames as a target temporal frame, motion information weights of the target temporal frame on the convolutional channels according to original feature submaps of the target temporal frame on the convolutional channels and original feature submaps of a next temporal frame adjacent to the target temporal frame on the convolutional channels.

The feature determining module is configured to obtain motion information feature maps of the target temporal frame on the convolutional channels according to the motion information weights and the original feature submaps of the target temporal frame on the convolutional channels.

The temporal interaction module is configured to perform temporal convolution on the motion information feature maps to obtain temporal motion feature maps of the target temporal frame on the convolutional channels.

The action recognition module is configured to: recognize an action type of a moving object in image data of the target temporal frame according to the temporal motion feature maps; and determine the action type as action information of the moving object in the current surveillance video data.

For a specific limitation on the action recognition apparatus, reference may be made to the limitation on the action recognition method above. Details are not described herein again. All or some of the modules in the foregoing action recognition apparatus may be implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 14:
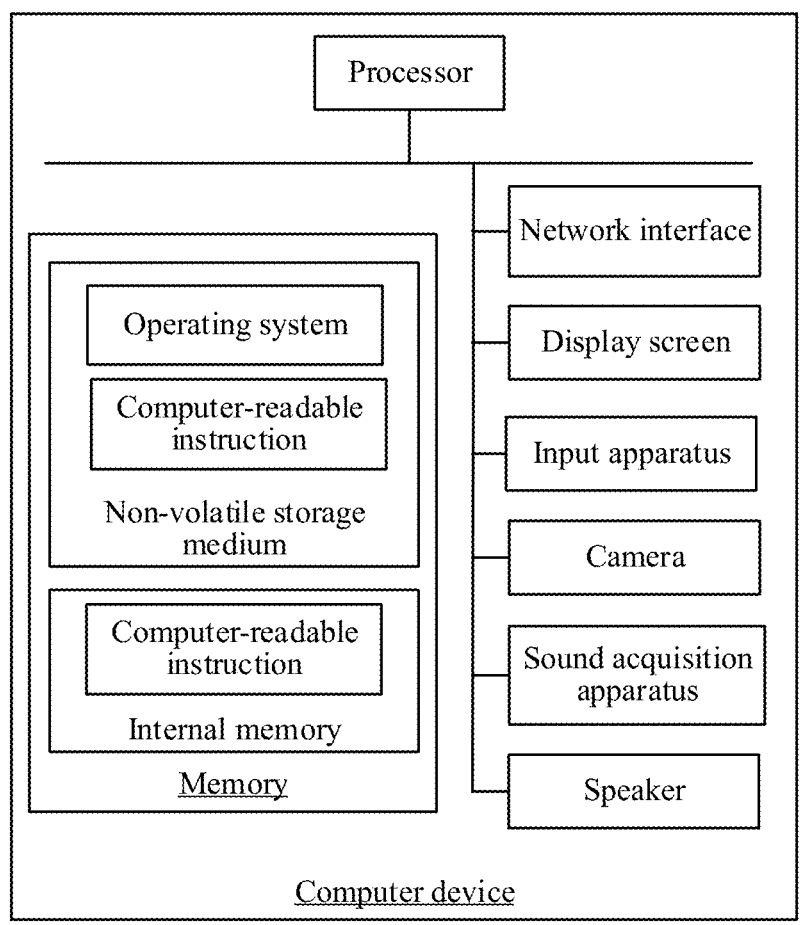
FIG. 14 is a structural block diagram of a computer device according to an embodiment.

FIG. 14 is a diagram of an internal structure of a computer device according to an embodiment. The computer device may be specifically the server 102 in FIG. 1. As shown in FIG. 14, the computer device includes one or more processors, a memory, a network interface, an input apparatus, and a display screen that are connected by using a system bus. The memory includes a non-volatile storage medium and an internal memory. The non-volatile storage medium of the computer device stores an operating system, and may further store computer-readable instructions. The computer-readable instructions, when executed by the one or more processors, may cause the one or more processors to implement an action recognition method. The internal memory may also store computer-readable instructions. The computer-readable instructions, when executed by the one or more processors, may cause the one or more processors to implement the action recognition method. The display screen of the computer device may be a liquid crystal display screen or an e-ink display screen. The input apparatus of the computer device may be a touch layer covering the display screen, or may be a button, a trackball, or a touchpad disposed on a housing of the computer device, or may be an external keyboard, touchpad, a mouse, or the like.

A person skilled in the art may understand that the structure shown in FIG. 14 is only a block diagram of a partial structure related to the solution of the present disclosure, and does not limit the computer device to which the solution of the present disclosure is applied. Specifically, the computer device may include more or fewer components than those shown in the figure, or some components may be combined, or a different component deployment may be used.

In an embodiment, the action recognition apparatus provided in the present disclosure may be implemented in a form of computer-readable instructions, and the computer-readable instructions are executable on the computer device shown in FIG. 14. The memory of the computer device may store program modules forming the action recognition apparatus, for example, the image obtaining module 1202, the weight obtaining module 1204, the feature determining module 1206, the temporal interaction module 1208, and the action recognition module 1210 shown in FIG. 12. Computer-readable instructions formed by the program modules cause the one or more processors to perform the steps in the action recognition method in the embodiments of the present disclosure described in this specification.

For example, the computer device shown in FIG. 14 may perform step S302 by using the image obtaining module 1202 in the action recognition apparatus shown in FIG. 12. The computer device may perform step S304 by using the weight obtaining module 1204. The computer device may perform step S306 by using the feature determining module 1206. The computer device may perform step S308 by using the temporal interaction module 1208. The computer device may perform step S310 by using the action recognition module 1210.

In an embodiment, a computer device is provided, including a memory and one or more processors, the memory storing computer-readable instructions, the computer-readable instructions, when executed by the one or more processors, causing the one or more processors to perform the steps in the foregoing action recognition method. The steps in the action recognition method herein may be the steps in the action recognition method in the foregoing embodiments.

In an embodiment, one or more computer-readable storage media are provided, storing computer-readable instructions, the computer-readable instructions, when executed by one or more processors, causing the one or more processors to perform steps in the foregoing action recognition method. The steps in the action recognition method herein may be the steps in the action recognition method in the foregoing embodiments.

The term "a plurality of" in the embodiments of the present disclosure means "at least two".

A person of ordinary skill in the art may understand that all or some procedures in the methods in the foregoing embodiments may be implemented by a computer-readable instruction instructing relevant hardware. The computer-readable instruction may be stored in a non-volatile computer-readable storage medium. When the computer-readable instruction is executed, the procedures of the foregoing method embodiments may be implemented. References to the memory, the storage, the database, or other medium used in the embodiments provided in the present disclosure may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. For the purpose of description instead of limitation, the RAM is available in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchronous link (Synchlink) DRAM (SLDRAM), a rambus (Rambus) direct RAM (RDRAM), a direct rambus dynamic RAM (DRDRAM), and a rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments show only several implementations of the present disclosure and are described in detail, which, however, are not to be construed as a limitation to the patent scope of the present disclosure. A person of ordinary skill in the art may further make several variations and improvements without departing from the ideas of the present disclosure, and such variations and improvements all fall within the protection scope of the present disclosure. Therefore, the protection scope of the patent of the present disclosure shall be subject to the appended claims.

What is claimed is:

1. An action recognition method, performed by a computer device, the method comprising:
    obtaining image data of video data in a plurality of different temporal frames;
    obtaining original feature submaps of each of the temporal frames on a plurality of different convolutional channels by using a multi-channel convolutional layer;
    calculating, by using each of the temporal frames as a target temporal frame, motion information weights of the target temporal frame on the convolutional channels according to the original feature submaps of the target temporal frame on the convolutional channels and the original feature submaps of a next temporal frame adjacent to the target temporal frame on each of the convolutional channels;
    obtaining motion information feature maps of the target temporal frame on the convolutional channels according to the motion information weights and the original feature submaps of the target temporal frame on the convolutional channels;
    performing temporal convolution on the motion information feature maps to obtain temporal motion feature maps of the target temporal frame on the convolutional channels; and
    recognizing an action type of a moving object in image data of the target temporal frame according to the temporal motion feature maps.

2. The method according to claim 1, wherein the calculating motion information weights of the target temporal frame on the convolutional channels according to the original feature submaps of the target temporal frame on the convolutional channels and the original feature submaps of a next temporal frame adjacent to the target temporal frame on the convolutional channels comprises:
    obtaining difference information between the original feature submaps of the target temporal frame and the original feature submaps of the next temporal frame on the convolutional channels; and
    mapping the difference information on the convolutional channels into the motion information weights of the target temporal frame on the convolutional channels by using an activation function.

3. The method according to claim 2, wherein the obtaining difference information between the original feature submaps of the target temporal frame and the original feature submaps of the next temporal frame on the convolutional channels comprises:

respectively transforming, by using a unit pooling layer, the original feature submaps of the target temporal frame on the convolutional channels into unit feature submaps of the target temporal frame, and the original feature submaps of the next temporal frame on the convolutional channels into unit feature submaps of the temporal frame;

respectively performing dimension reduction with a preset scaling factor on the unit feature submaps of the target temporal frame and the unit feature submaps of the next temporal frame to obtain dimension-reduced unit feature submaps of the target temporal frame and dimension-reduced unit feature submaps of the next temporal frame;

obtaining dimension-reduced difference information between the dimension-reduced unit feature submaps of the target temporal frame and the dimension-reduced unit feature submaps of the next temporal frame; and performing dimension raising with the preset scaling factor on the dimension-reduced difference information to obtain the difference information between the original feature submaps of the target temporal frame and the original feature submaps of the next temporal frame on the convolutional channels.

4. The method according to claim 1, wherein the performing temporal convolution on the motion information feature maps to obtain temporal motion feature maps of the target temporal frame on the convolutional channels comprises:

separately obtaining motion information feature maps of a preceding temporal frame adjacent to the target temporal frame on the convolutional channels and motion information feature maps of the next temporal frame on the convolutional channels; and performing, for each of the convolutional channels, a convolution operation on a motion information feature map of the target temporal frame, a motion information feature map of the preceding temporal frame, and a motion information feature map of the next temporal frame on the same convolutional channel by using a temporal convolution kernel, to obtain the temporal motion feature maps of the target temporal frame on the convolutional channels.

5. The method according to claim 1, wherein the recognizing an action type of a moving object in image data of the target temporal frame according to the temporal motion feature maps comprises:

inputting the temporal motion feature maps of the target temporal frame into a residual network layer, to obtain action feature information of the image data of the target temporal frame; and inputting the action feature information into an action classification network layer, to recognize the action type of the moving object in the image data of the target temporal frame.

6. The method according to claim 5, further comprising:
using the action feature information as the original feature submaps of the image data of the target temporal frame on the convolutional channels;

calculating again, the motion information weights of the target temporal frame on the convolutional channels according to the original feature submaps of the target temporal frame on the convolutional channels and the original feature submaps of the next temporal frame adjacent to the target temporal frame on the convolutional channels.

7. The method according to claim 1, further comprising:
determining, after action types of the moving object in the image data of the temporal frames are obtained, an action type corresponding to the video data according to the action types of the temporal frames.

8. The method according to claim 2, further comprising:
obtaining a training video sample, the training video sample comprising a plurality of different sample temporal frames and standard action types of a moving object in the sample temporal frames;

performing a training process comprising:
  obtaining original feature submap samples of each of the sample temporal frames on the different convolutional channels by using the multi-channel convolutional layer;

obtaining, by using each of the sample temporal frames as a target sample temporal frame, sample difference information between original feature submap samples of the target sample temporal frame and original feature submap samples of a next sample temporal frame on the convolutional channels;

mapping the sample difference information on the convolutional channels into motion information weight samples of the target sample temporal frame on the convolutional channels by using the activation function;

obtaining motion information feature map samples of the target sample temporal frame on the convolutional channels according to the motion information weight samples and the original feature submap samples of the target sample temporal frame on the convolutional channels;

performing temporal convolution on the motion information feature map samples of the target sample temporal frame on the convolutional channels, to obtain temporal motion feature map samples of the target sample temporal frame on the convolutional channels;

obtaining a predicted action type of the moving object in the target sample temporal frame according to the temporal motion feature map samples of the target sample temporal frame on the convolutional channels; and adjusting parameters of the multi-channel convolutional layer, the activation function, and a temporal convolution kernel according to a difference between the predicted action type and a standard action type of the target sample temporal frame; and continuing the training process until a training ending condition is met.

9. An action recognition method performed by a computer device, the method comprising:

obtaining real-time surveillance video data;

extracting image data in a plurality of different temporal frames from the surveillance video data;

obtaining original feature submaps of each of the temporal frames on a plurality of different convolutional channels by using a multi-channel convolutional layer;

calculating, by using each of the temporal frames as a target temporal frame, motion information weights of the target temporal frame on the convolutional channels according to the original feature submaps of the target temporal frame on the convolutional channels and the original feature submaps of a next temporal frame adjacent to the target temporal frame on each of the convolutional channels;

obtaining motion information feature maps of the target temporal frame on the convolutional channels according to the motion information weights and the original feature submaps of the target temporal frame on the convolutional channels;

performing temporal convolution on the motion information feature maps to obtain temporal motion feature maps of the target temporal frame on the convolutional channels;

recognizing an action type of a moving object in image data of the target temporal frame according to the temporal motion feature maps; and determining the action type as action information of the moving object included in the surveillance video data extracting image data.

10. An action recognition apparatus, comprising a memory and one or more processors, the memory storing computer-readable instructions, the computer-readable instructions, when executed by the one or more processors, causing the one or more processors to:

obtain image data of video data in a plurality of different temporal frames;

obtain original feature submaps of each of the temporal frames on a plurality of different convolutional channels by using a multi-channel convolutional layer;

calculate, by using each of the temporal frames as a target temporal frame, motion information weights of the target temporal frame on the convolutional channels according to original feature submaps of the target temporal frame on the convolutional channels and original feature submaps of a next temporal frame adjacent to the target temporal frame on the convolutional channels;

obtain motion information feature maps of the target temporal frame on the convolutional channels according to the motion information weights and the original feature submaps of the target temporal frame on the convolutional channels;

perform temporal convolution on the motion information feature maps to obtain temporal motion feature maps of the target temporal frame on the convolutional channels; and recognize an action type of a moving object in image data of the target temporal frame according to the temporal motion feature maps.

11. The apparatus according to claim 10, wherein the one or more processors are further configured to:

obtain difference information between the original feature submaps of the target temporal frame and the original feature submaps of the next temporal frame on the convolutional channels; and map the difference information on the convolutional channels into the motion information weights of the target temporal frame on the convolutional channels by using an activation function.

12. The apparatus according to claim 10, wherein the one or more processors are further configured to:

respectively transform, by using a unit pooling layer, the original feature submaps of the target temporal frame on the convolutional channels into unit feature submaps of the target temporal frame, and the original feature submaps of the next temporal frame on the convolutional channels into unit feature submaps of the temporal frame;

respectively perform dimension reduction with a preset scaling factor on the unit feature submaps of the target temporal frame and the unit feature submaps of the next temporal frame to obtain dimension-reduced unit feature submaps of the target temporal frame and dimension-reduced unit feature submaps of the next temporal frame;

obtain dimension-reduced difference information between the dimension-reduced unit feature submaps of the target temporal frame and the dimension-reduced unit feature submaps of the next temporal frame; and perform dimension raising with the preset scaling factor on the dimension-reduced difference information to obtain the difference information between the original feature submaps of the target temporal frame and the original feature submaps of the next temporal frame on the convolutional channels.

13. The apparatus according to claim 10, wherein the one or more processors are further configured to:

separately obtain motion information feature maps of a preceding temporal frame adjacent to the target temporal frame on the convolutional channels and motion information feature maps of the next temporal frame on the convolutional channels; and perform, for each of the convolutional channels, a convolution operation on a motion information feature map of the target temporal frame, a motion information feature map of the preceding temporal frame, and a motion information feature map of the next temporal frame on the same convolutional channel by using a temporal convolution kernel, to obtain the temporal motion feature maps of the target temporal frame on the convolutional channels.

14. The apparatus according to claim 10, wherein the one or more processors are further configured to: input the temporal motion feature maps of the target temporal frame into a residual network layer, to obtain action feature information of the image data of the target temporal frame; and input the action feature information into an action classification network layer, to recognize the action type of the moving object in the image data of the target temporal frame.

15. The apparatus according to claim 14, wherein the one or more processors are further configured to: use the action feature information as the original feature submaps of the image data of the target temporal frame on the convolutional channels;

calculate again, motion information weights of the target temporal frame on the convolutional channels according to the original feature submaps of the target temporal frame on the convolutional channels and the original feature submaps of the next temporal frame adjacent to the target temporal frame on the convolutional channels.

16. The apparatus according to claim 10, wherein the one or more processors are further configured to: determine, after action types of the moving object in the image data of the temporal frames are obtained, an action type corresponding to the video data according to the action types of the temporal frames.

17. The apparatus according to claim 11, wherein the one or more processors are further configured to:

obtain a training video sample, the training video sample comprising a plurality of different sample temporal frames and standard action types of a moving object in the sample temporal frames;

perform a training process comprising:
  obtaining original feature submap samples of each of the sample temporal frames on the different convolutional channels by using the multi-channel convolutional layer;
  obtaining, by using each of the sample temporal frames as a target sample temporal frame, sample difference information between original feature submap samples of the target sample temporal frame and original feature submap samples of a next sample temporal frame on the convolutional channels;
  mapping the sample difference information on the convolutional channels into motion information weight samples of the target sample temporal frame on the convolutional channels by using the activation function;
  obtaining motion information feature map samples of the target sample temporal frame on the convolutional channels according to the motion information weight samples and the original feature submap samples of the target sample temporal frame on the convolutional channels;
  performing temporal convolution on the motion information feature map samples of the target sample temporal frame on the convolutional channels, to obtain temporal motion feature map samples of the target sample temporal frame on the convolutional channels;
  obtaining a predicted action type of the moving object in an image sample of the target sample temporal frame according to the temporal motion feature map samples of the target sample temporal frame on the convolutional channels; and
  adjusting parameters of the multi-channel convolutional layer, the activation function, and a temporal convolution kernel according to a difference between the predicted action type and a standard action type of the target sample temporal frame, and continue the training process until a training ending condition is met.

18. The apparatus according to claim 10, wherein the one or more processors are further configured to:
  obtain real-time surveillance video data; and
  extract image data of the surveillance video data as the image data in the plurality of temporal frames.

19. One or more non-transitory computer-readable storage media, storing computer-readable instructions, the computer-readable instructions, when executed by one or more processors, causing the one or more processors to perform the method according to claim 1.

* * * * *